United States Patent
Hong et al.

(10) Patent No.: US 9,319,734 B2
(45) Date of Patent: Apr. 19, 2016

(54) DIGITAL BROADCASTING RECEIVER FOR MAGIC REMOTE CONTROL AND METHOD OF CONTROLLING THE RECEIVER

(71) Applicant: LG ELECTRONICS INC., Seoul (KR)

(72) Inventors: Hotaek Hong, Seoul (KR); Joonhui Lee, Seoul (KR); Sanghyun Kim, Seoul (KR); Kyutae Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/390,272

(22) PCT Filed: Apr. 5, 2013

(86) PCT No.: PCT/KR2013/002836
§ 371 (c)(1),
(2) Date: Oct. 2, 2014

(87) PCT Pub. No.: WO2013/151368
PCT Pub. Date: Oct. 10, 2013

(65) Prior Publication Data
US 2015/0058893 A1 Feb. 26, 2015

Related U.S. Application Data

(60) Provisional application No. 61/620,460, filed on Apr. 5, 2012.

(51) Int. Cl.
| | |
|---|---|
| H04N 21/422 | (2011.01) |
| H04N 21/438 | (2011.01) |
| H04N 21/442 | (2011.01) |
| G06F 3/0346 | (2013.01) |
| H04N 21/472 | (2011.01) |
| H04N 21/482 | (2011.01) |

(52) U.S. Cl.
CPC ........ *H04N 21/42222* (2013.01); *G06F 3/0346* (2013.01); *H04N 21/42221* (2013.01); *H04N 21/4384* (2013.01); *H04N 21/44222* (2013.01); *H04N 21/47205* (2013.01); *H04N 21/47217* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 2002/0169914 A1* | 11/2002 | Shteyn ..................... | 710/305 |
| 2004/0218104 A1* | 11/2004 | Smith et al. ............... | 348/734 |
| 2008/0069567 A1* | 3/2008 | Smith ....................... | 398/106 |

(Continued)

FOREIGN PATENT DOCUMENTS

| | | |
|---|---|---|
| KR | 10-2010-0063702 A | 6/2010 |
| KR | 10-2012-0010058 A | 2/2012 |

(Continued)

*Primary Examiner* — Nicholas Corbo
(74) *Attorney, Agent, or Firm* — Birch, Stewart, Kolasch & Birch, LLP

(57) ABSTRACT

The present invention relates to a digital broadcasting receiver for a magic remote control and a method of controlling the receiver. The digital broadcasting receiver for the magic remote control according to an embodiment of the present invention may include: a receiving unit receiving a control signal, wherein the control signal includes a first signal representing that a button of the magic remote control is pressed, a second signal representing the drag state of the magic remote control while the button of the magic remote control is pressed, and a third signal representing that the button of the magic remote control is released; a display unit; a processor; and a platform.

12 Claims, 21 Drawing Sheets

(56) References Cited

U.S. PATENT DOCUMENTS

| | | |
|---|---|---|
| 2013/0111395 A1* | 5/2013 | Ying et al. .................... 715/783 |
| 2013/0276031 A1 | 10/2013 | Oh et al. |
| 2014/0059616 A1 | 2/2014 | Hanko et al. |
| 2014/0289778 A1* | 9/2014 | Matsubayashi ................ 725/52 |

FOREIGN PATENT DOCUMENTS

| | | |
|---|---|---|
| KR | 10-2012-0023889 A | 3/2012 |
| KR | 10-2012-0028014 A | 3/2012 |
| KR | 10-2012-0029588 A | 3/2012 |

\* cited by examiner

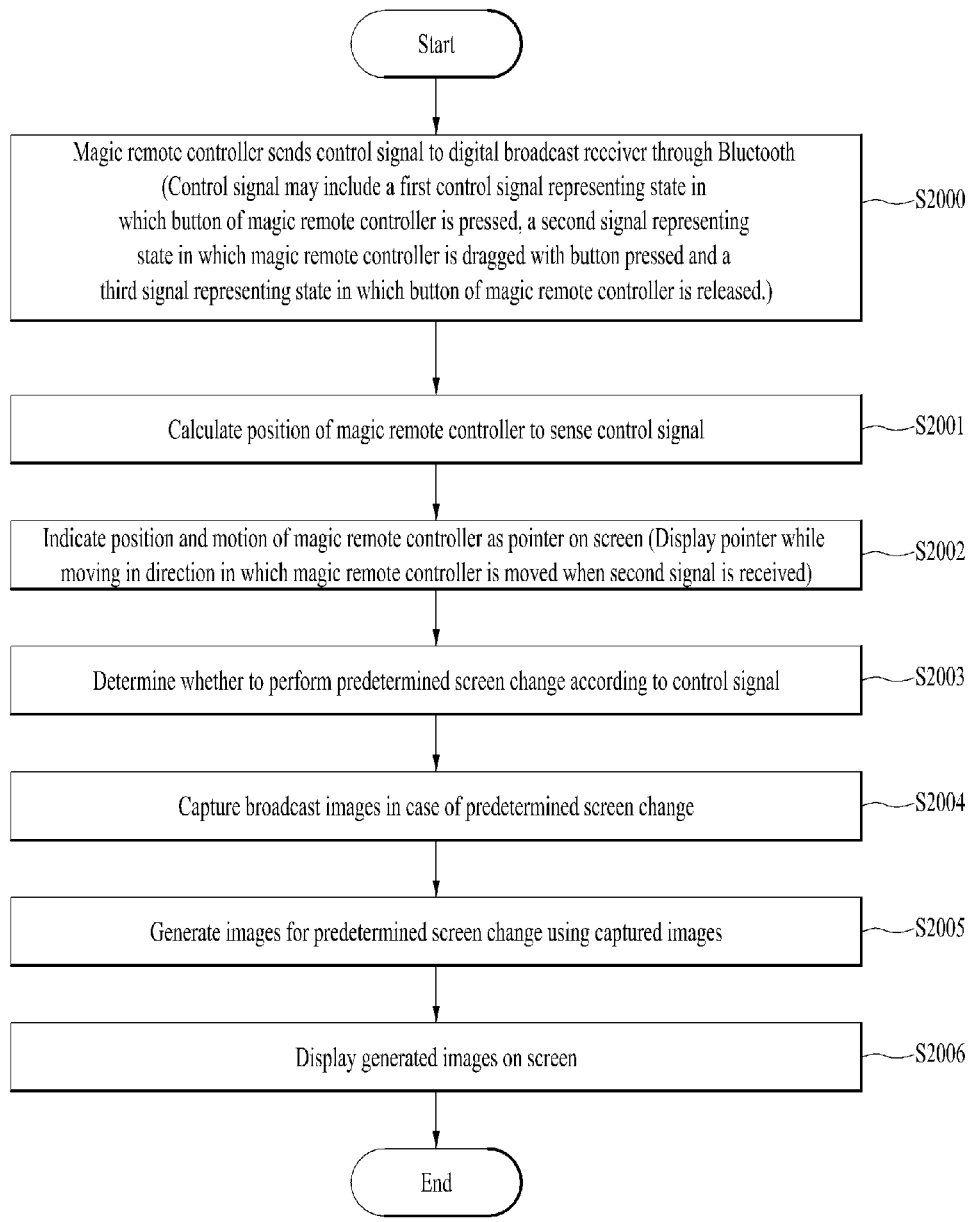

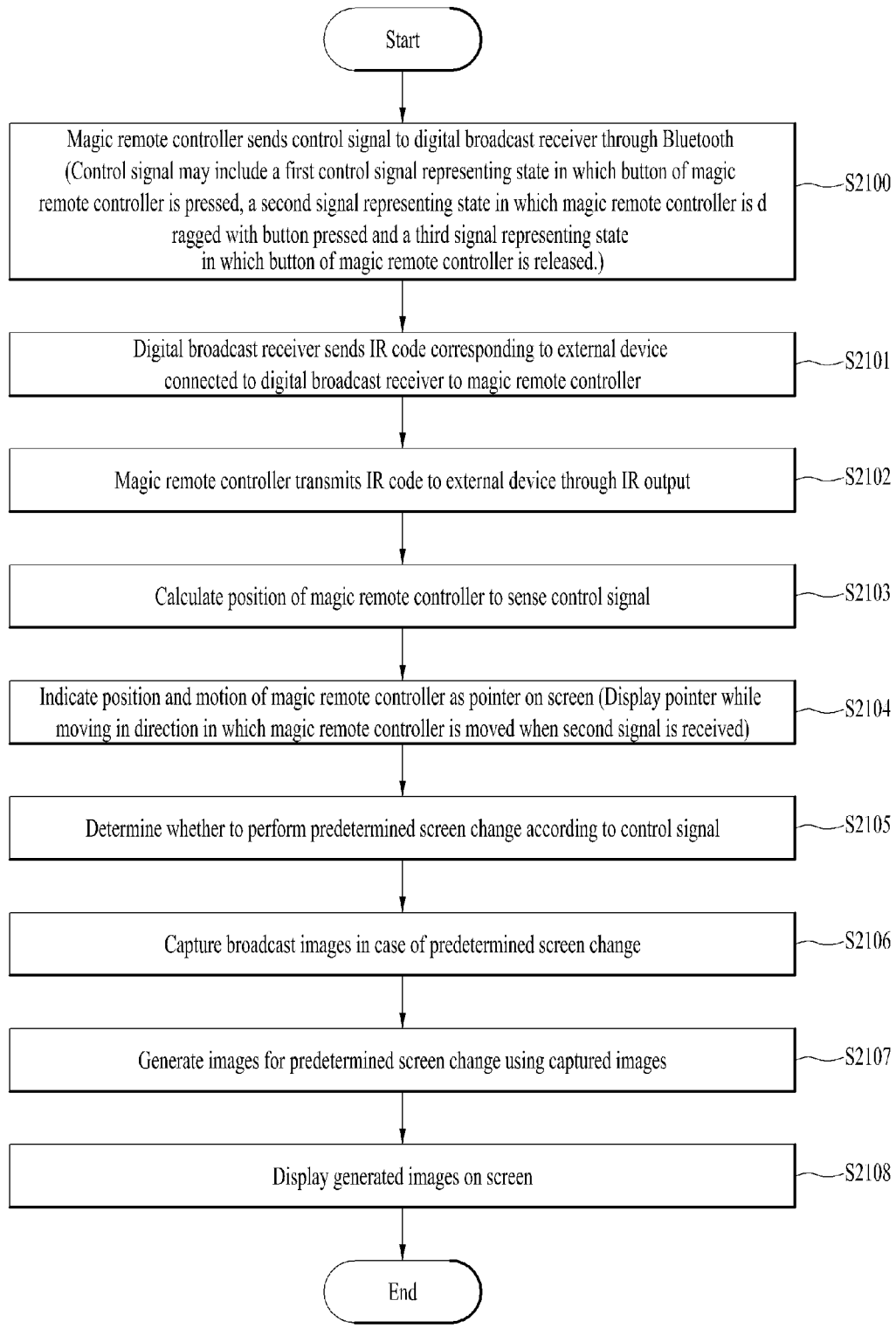

DIGITAL BROADCASTING RECEIVER FOR MAGIC REMOTE CONTROL AND METHOD OF CONTROLLING THE RECEIVER

CROSS REFERENCE TO RELATED APPLICATIONS

This application is the National Phase of PCT International Application No. PCT/KR2013/002836, filed on Apr. 5, 2013, which claims priority under 35 U.S.C. 119(e) to U.S. Provisional Application No. 61/620,460, filed on Apr. 5, 2012, all of which are hereby expressly incorporated by reference into the present application.

TECHNICAL FIELD

The present invention relates to a digital broadcast receiver having a user interface (UI) which is implemented to execute a TV function only with minimum input in use of a magic remote controller for controlling the digital broadcast receiver and a method of controlling the digital broadcast receiver. In addition, the present invention relates to an apparatus and method for implementing a magic remote controller UI for controlling a digital broadcast receiver and various external input devices in an integrated manner.

BACKGROUND ART

A remote controller through which a user inputs a command is used for a digital broadcast receiver such as a smart TV. The remote controller basically includes power, channel change, volume control, external input change keys, numeral keys, etc. Furthermore, the remote controller is additionally provided with keys for supporting setting of the digital broadcast receiver, a key for executing a 3D function, a key for accessing a smart TV menu in the case of a smart TV, etc.

This remote controller based on numeral keys is manufactured for terrestrial broadcasts in order to control the digital broadcast receiver while easily changing a limited number of channels. However, the digital broadcast receiver currently supports various functions such as watching terrestrial broadcasts, watching cable broadcasts through connection of a set-top box, execution of an extended function through connection of an external device such as a DVD player, use of the Internet through a browser, etc.

As the purpose of the digital broadcast receiver is extended, a magic remote controller using a gyroscope appears. According to the magic remote controller, movement of the remote controller is sensed through the gyroscope and the sensed movement is converted into coordinates in the digital broadcast receiver and a pointer corresponding to the coordinates is displayed on the screen of the receiver. To this end, a user interface (UI) of the digital broadcast receiver is modified such that the pointer can be moved and selected.

When a conventional UI is used, a function of the digital broadcast receiver is executed by 1) calling a menu by moving a button or a pointer on the magic remote controller, 2) moving the pointer to a desired function on the menu and 3) selecting the desired function by clicking the pointer.

However, the aforementioned operation is performed only when a function included in the called menu is executed. Since additional keys for functions such as channel change, volume control and the like, which are necessary to watch a broadcast, are allocated to the magic remote controller, the UE cannot be unified.

Furthermore, a conventional magic remote controller does not use a drag operation. The magic remote controller having no drag function does not meet requirements of users accustomed to use touch-based devices.

In addition, when an external device is present, functions such as playback, and search, used in the external device, are not included in the conventional UI and thus the digital broadcast receiver and the external device cannot be controlled in an integrated manner using the magic remote controller. For example, when a user mainly watches cable broadcasts instead of terrestrial broadcasts, the user does not use the magic remote controller for purposes other than power and volume control.

DISCLOSURE

Technical Problem

An object of the present invention devised to solve the problem lies in a control method and control apparatus for allowing users to use a digital broadcast receiver and external devices connected thereto on the basis of user experience in using touch-based devices such as smartphones so as to meet requirements of users accustomed to touch-based devices such as a smartphone, smartpad, etc.

Another object of the present invention provides a control method and apparatus for touching a screen using a magic remote controller by moving the screen through an improved UI through a drag operation of the magic remote controller.

Another object of the present invention provides a control method and a control apparatus for providing an integrated UI in control of various TV functions and/or a connected external device by using one magic remote controller.

Technical Solution

In an aspect of the present invention, a digital broadcast receiver for a magic remote controller includes: a receiving unit for receiving a control signal from the magic remote controller through Bluetooth, wherein the control signal includes a first signal representing a state in which a button of the magic remote controller is pressed, a second signal representing a drag state of the magic remote controller with the button of the magic remote controller pressed, and a third signal representing a state in which the button of the magic remote controller is released; a display unit for displaying an OSD according to broadcast images and/or the received controller; a processor configured to calculate a position of the magic remote controller so as to sense the control signal, to indicate the position and motion of the magic remote controller as a pointer on a screen, to display the pointer while moving the pointer in a direction in which the magic remote controller is moved when the receiver receives the second signal, and to determine whether to perform predetermined screen change according to the control signal; and a platform for capturing the broadcast images when the predetermined screen change is performed, generating phased images for the predetermined screen change using the captured images and controlling the phased images to be displayed on the screen.

When the predetermined screen change corresponds to screen change according to channel change, the platform may capture a first image with respect to a still image of broadcast images of a current channel and a second image with respect to a still image of broadcast images of a neighboring channel when the receiver receives the first signal, the platform sequentially displaying the first image, a third image obtained by blending the first and second images and the second image when the receiver receives the second signal, the platform displaying the first image or the second image when the receiver receives the third signal.

The processor may control information on the neighboring channel to be displayed as an OSD when the pointer is located in an upper or lower area of the screen.

The platform may control areas of the first image and the second image included in the blended third image on the basis of a degree by which the magic remote controller is dragged according to the second signal, and the processor may control the digital broadcast receiver to tune to the current channel when the area of the first image included in the third image is larger than the area of the second image at a time when the third signal is received and control the digital broadcast receiver to tune to the neighboring channel when the area of the second image included in the third image is larger than the area of the first image.

When the predetermined screen change corresponds to screen change according to EPG (Electronic Program Guide) display, the screen may include a first area displaying current channel and input information according to the control signal, a second area displaying detailed information on a current channel and input according to the control signal, a third area displaying a channel list according to the control signal and a fourth area displaying the EPG according to the control signal, and the processor may display the first area on the screen when the receiver receives the first signal, display the second or third area on the screen when the receiver receives the second signal and display the fourth area on the screen when the receiver receives the third signal.

When the receiver receives the second signal, the processor may display the second area on the screen when the pointer is moved from the first area to the second area and display the third area on the screen when the pointer is moved from the first area to the third area.

Channels may be searched using the pointer in the third and fourth areas according to the second signal, and a channel may be changed according to the first and third signals.

In another aspect of the present invention, an apparatus for implementing a magic remote controller UI includes: a digital broadcast receiver receiving a control signal from a magic remote controller through Bluetooth; an external device connected to the digital broadcast receiver; and the magic remote controller receiving an IR code corresponding to the external device from the digital broadcast receiver when the digital broadcast receiver receives the control signal and sending the received IR code to the external device through IR output, wherein the control signal includes a first signal representing a state in which a button of the magic remote controller is pressed, a second signal representing a drag state of the magic remote controller with the button of the magic remote controller pressed, and a third signal representing a state in which the button of the magic remote controller is released; wherein the digital broadcast receiver comprises: a receiving unit for receiving the control signal; a display unit for displaying OSD according to broadcast images and/or the received controller; a processor configured to calculate a position of the magic remote controller so as to sense the control signal, to indicate the position and motion of the magic remote controller as a pointer on a screen, to display the pointer while moving the pointer in a direction in which the magic remote controller is moved when the receiver receives the second signal, and to determine whether to perform predetermined screen change according to the control signal; and a platform for capturing the broadcast images when the predetermined screen change is performed, generating phased images for the predetermined screen change using the captured images and controlling the phased images to be displayed on the screen.

The platform may receive the IR code through the Internet when the IR code corresponding to the external device is not present.

When the predetermined screen change corresponds to screen change according to channel change, the platform may capture a first image with respect to a still image of broadcast images of a current channel and capture a second image with respect to a black mute screen when the receiver receives the first signal, the platform sequentially displaying the first image, a third image obtained by blending the first and second images and the second image when the receiver receives the second signal, the platform displaying the first image or the second image when the receiver receives the third signal.

The processor may control information on a neighboring channel to be displayed as an OSD when the pointer is located in an upper or lower area of the screen.

The platform may control areas of the first image and the second image included in the blended third image on the basis of a degree by which the magic remote controller is dragged according to the second signal, and the processor may control the digital broadcast receiver to tune to the current channel when the area of the first image included in the third image is larger than the area of the second image at a time when the third signal is received and control the digital broadcast receiver to tune to the neighboring channel when the area of the second image included in the third image is larger than the area of the first image.

When the predetermined screen change corresponds to screen change according to a trick mode, the processor may toggle playback or pause state when the button of the magic remote controller is double clicked, control current images displayed on the screen to be played fast when the receiver receives the second signal and control a playback mode to be converted to a normal playback mode when the receiver receives the first signal during fast playback.

When the predetermined screen change corresponds to screen change according to the trick mode, the processor may toggle playback or pause state when the button of the magic remote controller is double clicked and control content of a neighboring chapter to be displayed when the receiver receives the second signal, wherein, when the receiver continuously receives a plurality of second signals respectively corresponding to different directions in which the magic remote controller is moved, the processor controls content of a neighboring chapter according to the finally received second signal to be displayed.

In another aspect of the present invention, a method for controlling a digital broadcast receiver for a magic remote controller includes: transmitting a control signal from the magic remote controller to the digital broadcast receiver through Bluetooth, wherein the control signal includes a first signal representing a state in which a button of the magic remote controller is pressed, a second signal representing a drag state of the magic remote controller with the button of the magic remote controller pressed, and a third signal representing a state in which the button of the magic remote controller is released; calculating a position of the magic remote controller so as to sense the control signal; indicating the position and motion of the magic remote controller as a pointer on a screen and displaying the pointer while moving the pointer in a direction in which the magic remote controller is moved when the second signal is received; determining whether predetermined screen change is performed according to the control signal; capturing broadcast images when the predetermined screen change is performed; generating phased images for the predetermined screen change using the captured images; and controlling the phased images to be displayed on the screen.

In another aspect of the present invention, a method for implementing a magic remote controller UI includes: transmitting a control signal from a magic remote controller to a digital broadcast receiver through Bluetooth, wherein the control signal includes a first signal representing a state in which a button of the magic remote controller is pressed, a second signal representing a drag state of the magic remote controller with the button of the magic remote controller pressed, and a third signal representing a state in which the button of the magic remote controller is released; transmitting, from the digital broadcast receiver to the magic remote controller, an IR code corresponding to an external device connected to the digital broadcast receiver; transmitting the IR code from the magic remote controller to the external device through IR output; calculating a position of the magic remote controller so as to sense the control signal; indicating the position and motion of the magic remote controller as a pointer on a screen and displaying display the pointer while moving the pointer in a direction in which the magic remote controller is moved when the second signal is received; determining whether predetermined screen change is performed according to the control signal; capturing broadcast images when the predetermined screen change is performed; generating phased images for the predetermined screen change using the captured images; and controlling the phased images to be displayed on the screen.

Advantageous Effects

According to the digital broadcast receiver for a magic remote controller and the method of controlling the same of the present invention, it is possible to provide various user command input schemes and to provide user experience as if a user, who is spaced apart from the digital broadcast receiver by a predetermined distance or more, directly touches a screen of the digital broadcast receiver.

In addition, it is possible to maintain consistent user experience in watching images, channel and input change, checking an EPG and external device control through an enhanced UI.

DESCRIPTION OF DRAWINGS

FIG. 20 is a flowchart illustrating a method for controlling a digital broadcast receiver for a magic remote controller accordina to an embodiment of the present invention.

FIG. 21 is a flowchart illustrating a method for implementing a magic remote controller UI according to an embodiment of the present invention.

BEST MODE

The configuration, operation, and other features of the present invention will readily be understood with embodiments of the present invention described with reference to the attached drawings.

The configuration and operation of the present invention, which are illustrated in and described by the accompanying drawings, are described as at least one embodiment. However, it will be apparent to those skilled in the art that the technical spirit and essential configuration and operation of the present invention are not limited to the specific embodiment as set forth herein.

Figure 1:
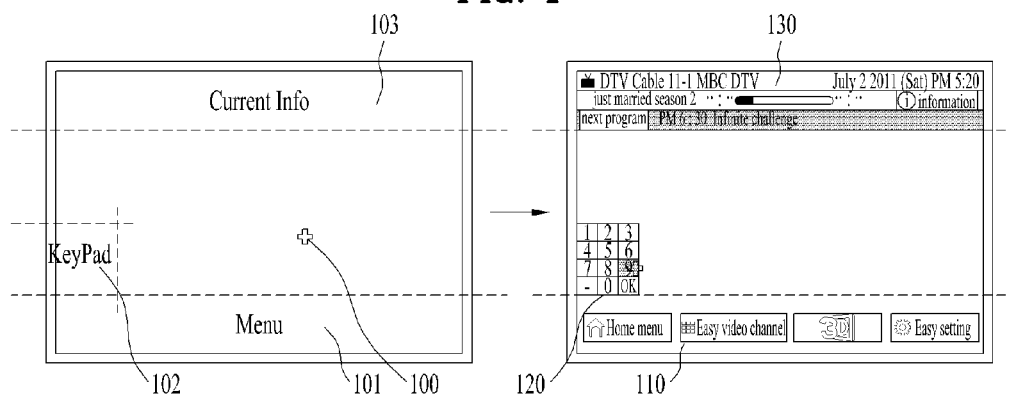
FIG. 1 illustrates a configuration of a UI of a conventional digital broadcast receiver for a magic remote controller.

FIG. 1 illustrates a configuration of a UI of a conventional digital broadcast receiver for a magic remote controller.

Referring to FIG. 1, a screen of the conventional digital broadcast receiver for the magic remote controller may be segmented into a menu area 101, a keypad area 102 and a channel information area 103, and the UI of the conventional digital broadcast receiver for the magic remote controller may include a menu 110, a keypad 120 and channel information 130. The position and motion of the magic remote controller can be indicated by a pointer 100 on the screen.

The UI of the conventional digital broadcast receiver for the magic remote controller can be configured to display OSDs 110, 120 and 130 representing functions corresponding to specific areas 101, 102 and 103 upon movement of the pointer 100 indicated on the screen to the specific areas 101, 102 and 103 on the screen. When the pointer 100 is moved to an item corresponding to a desired function on the displayed OSD and clicked, the desired function can be executed in the digital broadcast receiver.

However, when the UI of the conventional digital broadcast receiver for the magic remote controller is used, user experience is not combined. Specifically, the UI of the conventional digital broadcast receiver for the magic remote controller does not include functions such as power on/off, channel change and the like and additional keys corresponding to the functions are provided to the magic remote controller such that the functions are executed using the keys irrespective of the UI.

In addition, when an external device is present, functions corresponding to a play key, search key, color key and the like, which are mainly used in the external device, are not included in the UI of the conventional digital broadcast receiver for the magic remote controller and thus the magic remote controller cannot be used as a unified remote controller for the external device.

Accordingly, to solve the aforementioned problems, the present invention proposes a newly configured UI of a digital broadcast receiver.

Figure 2:
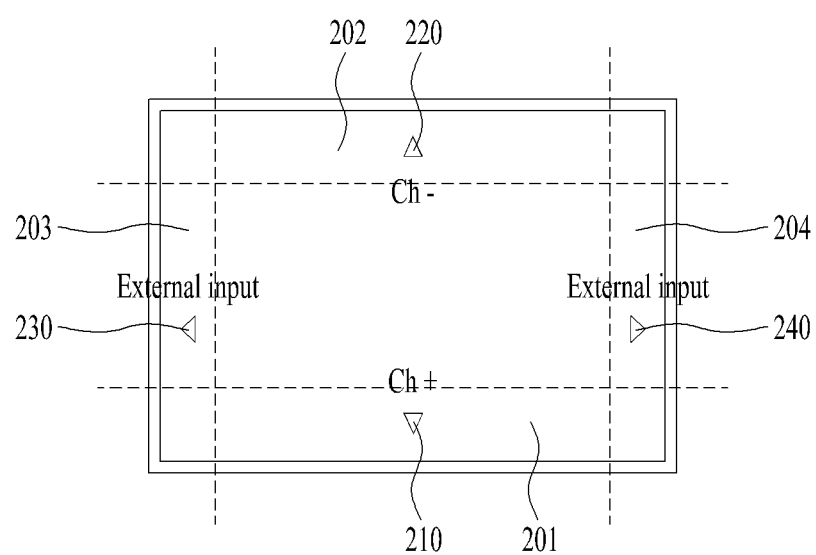
FIG. 2 illustrates a configuration of a UI of a digital broadcast receiver for a magic remote controller according to an embodiment of the present invention.

FIG. 2 illustrates a configuration of a UI of a digital broadcast receiver for a magic remote controller according to an embodiment of the present invention.

Referring to FIG. 2, the UI of the digital broadcast receiver for the magic remote controller may display OSDs with respect to specific functions such as channel change 210 and 220 and external input change 230 and 240 in top, bottom, left and right areas 202, 201, 203 and 204 of the screen of the digital broadcast receiver.

The magic remote controller may be recognized as a pointer on the screen of the digital broadcast receiver. When the pointer 100 is moved to the specific areas 201, 202, 203 and 204, OSDs 210, 220, 230 and 240 with respect to predetermined specific functions are displayed. Upon display of the OSDs 210, 220, 230 and 240, the UI may be changed to a drag based UI. According to the drag based UI, a state in which a button of the magic remote controller is pressed and a state in which the button is released are separately recognized such that a drag operation can be used to control the digital broadcast receiver for the magic remote controller. The predetermined specific functions may be channel change 210 and 220 and/or external input change 230 and 240, as shown in FIG. 2.

The present invention proposes a UI of the digital broadcast receiver, which is newly configured to control the digital broadcast receiver according to a drag operation while minimizing the number of buttons of the magic remote controller on the basis of the UI configuration shown in FIG. 2.

Specifically, 1) the screen of the digital broadcast receiver is segmented, a UI with respect to a predetermined operation is displayed when the magic remote controller is moved to a segmented area or a button of the magic remote controller is pressed, and the predetermined operation is performed when the button is released or clicked and 2) an operation of moving the screen, similarly to touchscreen operation, is implemented in a drag state to achieve natural screen change. In addition, 3) a system is configured to interoperate with an external device through two input channels such as Bluetooth, WiFi, IR (Infrared), etc. when the external device is present such that operations of the external device can be included in a digital broadcast receiver viewing experience.

Figure 3:
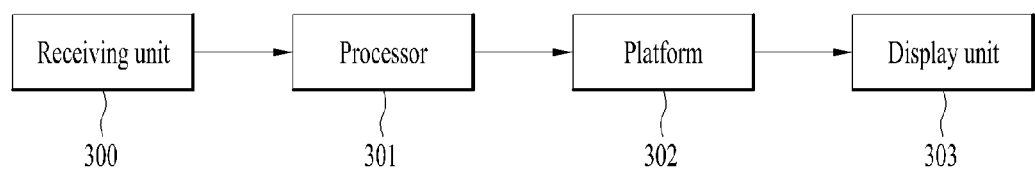
FIG. 3 illustrates a digital broadcast receiver for a magic remote controller according to an embodiment of the present invention.

FIG. 3 illustrates a digital broadcast receiver for a magic remote controller according to an embodiment of the present invention.

The digital broadcast receiver according to an embodiment of the present invention may include a receiving unit 300, a processor 301, a platform 302 and/or a display unit 303.

The receiving unit 300 may receive information on the position and motion of the magic remote controller through a Bluetooth channel. The magic remote controller according to an embodiment of the present invention may control functions of the digital broadcast receiver only using two keys corresponding to a power button and a function button. A user can press a corresponding button of the magic remote controller, move the magic remote controller with the button pressed and release the pressed button. User command input is defined by a position and motion of the magic remote controller.

The processor 301 may convert information on the position and motion of the magic remote controller into a pointer on the screen of the digital broadcast receiver. The position and motion of the magic remote controller can be indicated as the pointer on the screen. The processor 301 may convert the position and motion of the magic remote controller into coordinates and moving speed of the pointer on the screen. The processor 301 may recognize the position and motion of the pointer and thus determine whether to execute a function of the digital broadcast receiver according to user command input.

The platform 302 may execute a function according to a user command. To execute a function, a screen displaying broadcast images being played may be changed. Images necessary for screen change may be generated in such a manner that the broadcast images being played are captured by the platform 302 and the captured images are configured as phased images. The phased images may be composed of capture images of the broadcast images being played and a target input image. For example, the phased images can include part of broadcast images being played and part of the target input image. As the screen changes, the phased images may be synthesized 1) such that part of broadcast images being played, included in the phased images, has a larger area than part of the target input image, 2) such that part of the broadcast images being played has an area having the same size as part of the target input image, or 3) such that part of the broadcast images being played has a smaller area than part of the target input image.

The platform 302 may control images necessary for screen change to be displayed.

The display unit 303 may display broadcast images, phased images necessary for screen change and an OSD representing information on execution of a function according to a user command on the screen of the digital broadcast receiver.

Figure 4:
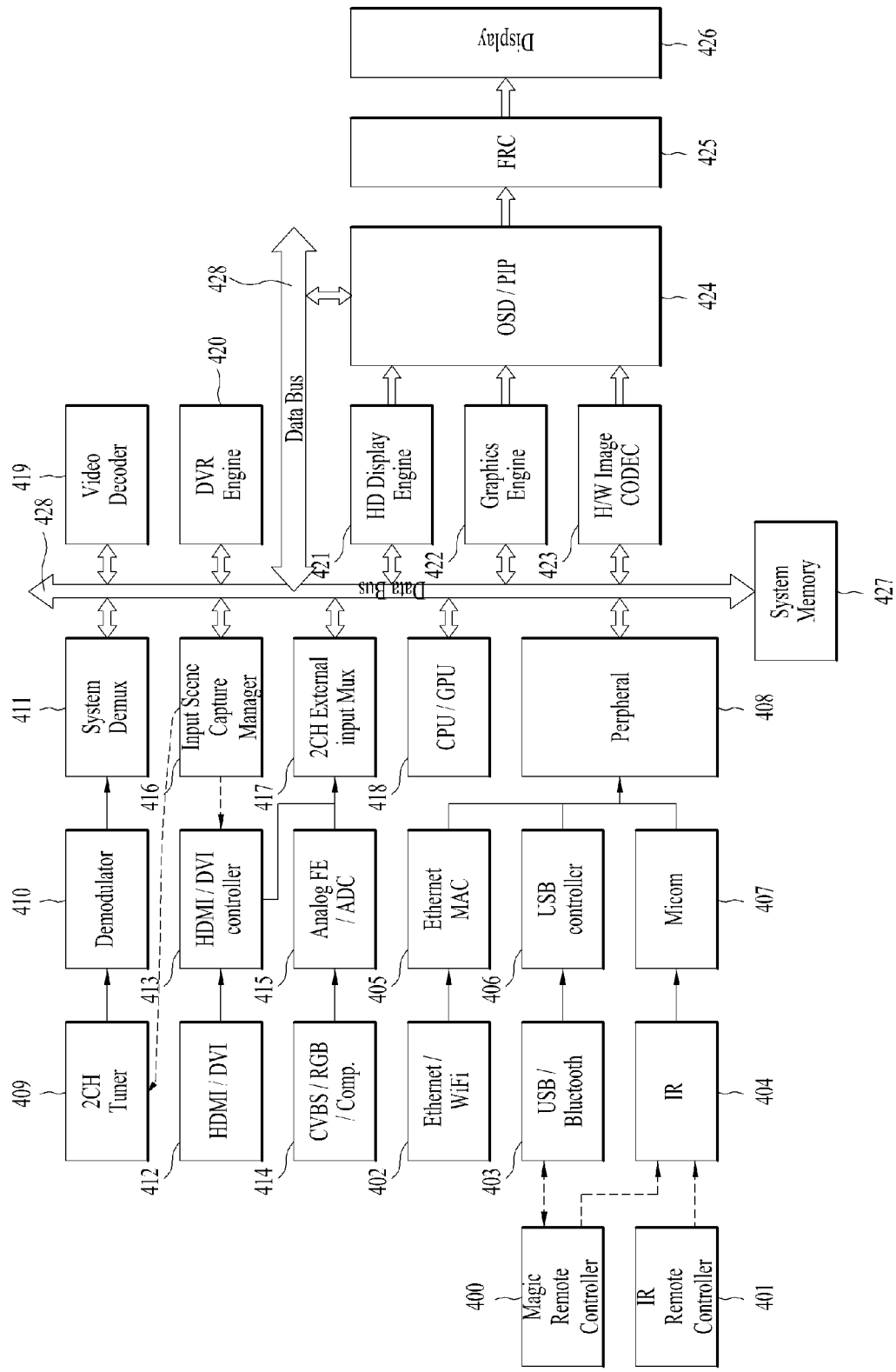
FIG. 4 illustrates a configuration of the digital broadcast receiver for the magic remote controller according to an embodiment of the present invention.

FIG. 4 illustrates a configuration of the digital broadcast receiver for the magic remote controller according to an embodiment of the present invention.

The digital broadcast receiver for the magic remote controller, which can be controlled by a magic remote controller 400 and/or an IR remote controller 401, according to an embodiment of the present invention may include Ethernet/WiFi 402, a USB/Bluetooth 403, an IR interface 404, an Ethernet MAC 405, a USB controller 406, a microcomputer 407, a peripheral 408, a 2CH tuner 409, a demodulator 410, a system DEMUX 411, an HDMI (High Definition Multimedia Interface)/DVI (Digital Visual Interface) cable 412, an HDMI/DVI controller 413, a CVBS (Composite Video Banking Sync)/RGB (Red-Green-Blue)/Comp 414, an analog FE/ADC (Analog-to-Digital Converter) 415, an input scene capture manager 416, a 2CH external input MUX 417, a CPU/GPU 418, a video decoder 419, a DVR (Digital Video Recorder) engine 420, an HD display engine 421, a graphics engine 422, a hardware image CODEC 423, OSD (On Screen Display)/PIP (Photo-Interpretive Program) 424, an FRC (Frame Rate Control) 425, a display 426, a system memory 427, and/or a data bus 428.

The magic remote controller 400 may send information on the position and motion thereof to the digital broadcast receiver through the USB/Bluetooth 403 and/or IR interface 404.

The RI remote controller 401, which transmits/receives signals using infrared light, may transmit information on the position and motion thereof to the digital broadcast receiver through the IR interface 404.

The Internet may be used through the Ethernet/WiFi 402.

The USB/Bluetooth 403 may be an interface between the magic remote controller 400 and the digital broadcast receiver. The USB/Bluetooth 403 may be used to transmit/receive signals between the magic remote controller 400 and the digital broadcast receiver through a USB port and/or a Bluetooth channel.

The IR interface 404 may be an interface between the IR remote controller 401 and the digital broadcast receiver. The IR interface 404 is used to transmit/receive signals between the magic remote controller 400 and the digital broadcast receiver through an IR channel.

The Ethernet MAC 405 may represent an Ethernet address of the digital broadcast receiver.

The USB controller 406 may control operations of the USB 403.

The microcomputer 407 may control various signals received by the digital broadcast receiver.

The peripheral 408 may be an interface between signals received by the digital broadcast receiver and components that handle the signals and various engines.

The 2CH tuner 409 may tune two channels.

The demodulator 410 may demodulate a modulated signal into the original signal.

The system DEMUX 411 may separate an audio stream and a video stream of a broadcast image from each other.

The HDMI/DVI cable 412 may transmit video and/or audio of broadcast information to hardware.

The HDMI/DVI controller 413 may control operations of the HDMI and/or DVI cables.

The CVBS/RGB/Comp 414 may represent a luminance signal expressing luminance and/or a color signal expressing color.

The analog FE/ADC 415 may convert an analog signal into a digital signal.

The capture manager 416 may control capture of a broadcast image. The 2CH tuner 404 can capture a small image such as a thumbnail.

The 2CH external input MUX 417 may be a path through which external signals input to the digital broadcast receiver are controlled.

The CPU/GPU may execute storage, computation and control functions of the digital broadcast receiver.

The video decoder 419 may code a digital signal of a video file or restore a coded signal.

The DVR engine 420 may support a digital image storage function.

The HD display engine 421 may support a function of merging generated images for screen change effect.

The graphics engine 422 may generate phased images using captured images. The phased images may be displayed during screen change. The graphics engine may control a process of displaying the phased images for natural screen change.

The hardware image CODEC 423 may compress an image file and decompress a compressed image file. The OSD/PIP 424 may display a menu on the screen of the digital broadcast receiver or control the resolution of the screen. The OSD 424 may be implemented in full HD to be suited to full HD broadcast images. A data bandwidth of 32 bits or more may be secured between the OSD 424 and the CPU 418 to implement the full HD OSD 424.

The FRC 425 may control a frame rate.

The display 426 may display a broadcast image according to user input.

The system memory 427 may be a memory having a sufficient space to capture and store images necessary for channel change.

The data bus 428 may be a path through which data signals are transmitted to components of the digital broadcast receiver.

Figure 5:
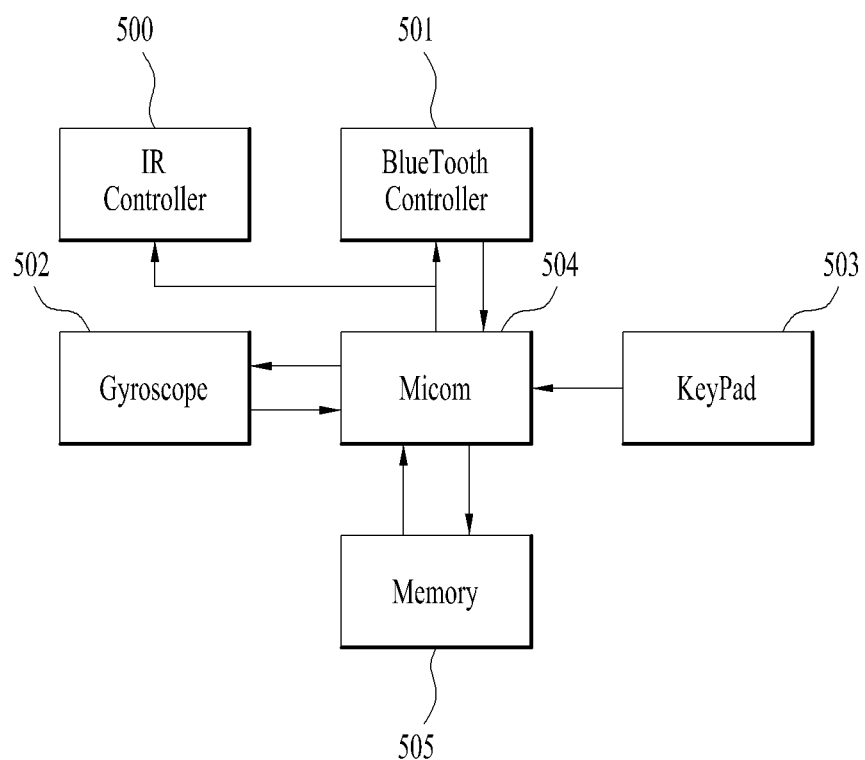
FIG. 5 illustrates a configuration of the magic remote controller according to an embodiment of the present invention.

FIG. 5 illustrates a configuration of the magic remote controller according to an embodiment of the present invention.

The magic remote controller according to one embodiment may include an IR controller 500, a Bluetooth controller 501, a gyroscope 502, a keypad 503, a microcomputer 504 and/or a memory 505.

The IR controller 500 may transmit a signal of the magic remote controller as infrared rays. A unique code may be defined per key for each external device to be controlled by the magic remote controller. Infrared rays may be used for power control of the digital broadcast receiver.

The Bluetooth controller 501 may be an interface used for the magic remote controller to control the digital broadcast receiver. Two-way communication can be performed according to characteristics of Bluetooth. The digital broadcast receiver may transmit signals through a Bluetooth channel using the magic remote controller.

The gyroscope 502 generates information on the position and motion of the magic remote controller. The gyroscope 502 may transmit the information on the position and motion of the magic remote controller to the microcomputer 504.

A button of the magic remote controller may be pressed using the keypad 503.

The microcomputer 504 may control interface with the IR controller 500 and the Bluetooth controller 501. The microcomputer 504 may process the information on the position and motion of the magic remote controller, received from the gyroscope, to convert the information into coordinate information on the screen of the digital broadcast receiver. The microcomputer 504 may process an input value of the keypad 503 and transmit the processed value to the digital broadcast receiver.

The memory 505 may be used as a storage space necessary for an IR key code related to the digital broadcast receiver and execution of a program for operations of the magic remote controller.

Figure 6:
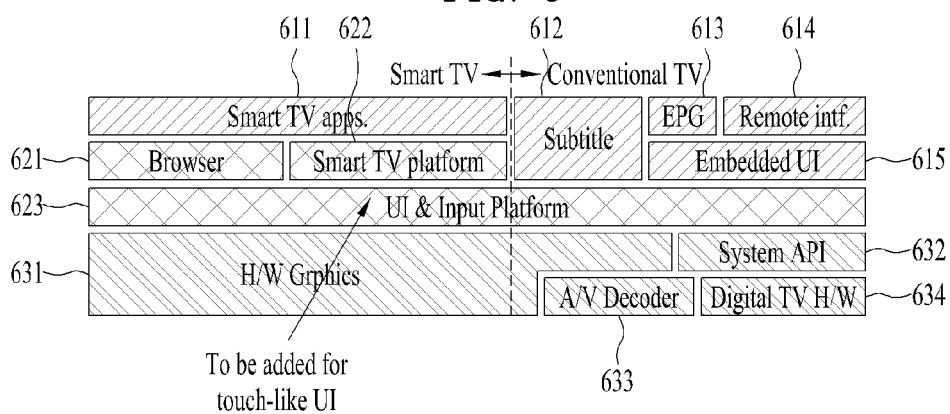
FIG. 6 illustrates a software structure of the digital broadcast receiver for the magic remote controller according to an embodiment of the present invention.

FIG. 6 illustrates a software structure of the digital broadcast receiver for the magic remote controller according to an embodiment of the present invention.

A software layer of the digital broadcast receiver for the magic remote controller may include an application layer 610, a middleware 620 and/or a hardware & system layer 630.

The application layer 610 may include a smart TV application 611 necessary to execute functions of a smart TV. The application layer 610 may include a subtitle 612 necessary to execute a conventional TV function, an EPG (Electronic Program Guide) 613, a remote interface 614 and/or an embedded UI 615.

The middleware 620 may include a browser 621 and/or a smart TV platform 622. In addition, the middleware 620 may include a UI & input platform (referred to as a "platform" hereinafter) 623.

The hardware & system layer 630 may include a hardware (H/W) graphics 631, a system API (Application Programming Interface) 632, an A/V decoder 633 and/or digital TV hardware 634.

As shown in FIG. 6, the digital broadcast receiver according to the present invention may include a software platform 600 for smooth screen change in order to implement a UI similar to a UI of a touch-based device such as a smartphone. The platform 623 is a layer capable of supporting operation of the magic remote controller, capture for screen change, and composition of phased images through the graphics engine in a software manner. The embedded UI 615 may be used for user command input, such as channel change, input change or the like, and image output. Screen change effect and OSD may be achieved in the platform 623.

Figure 7:
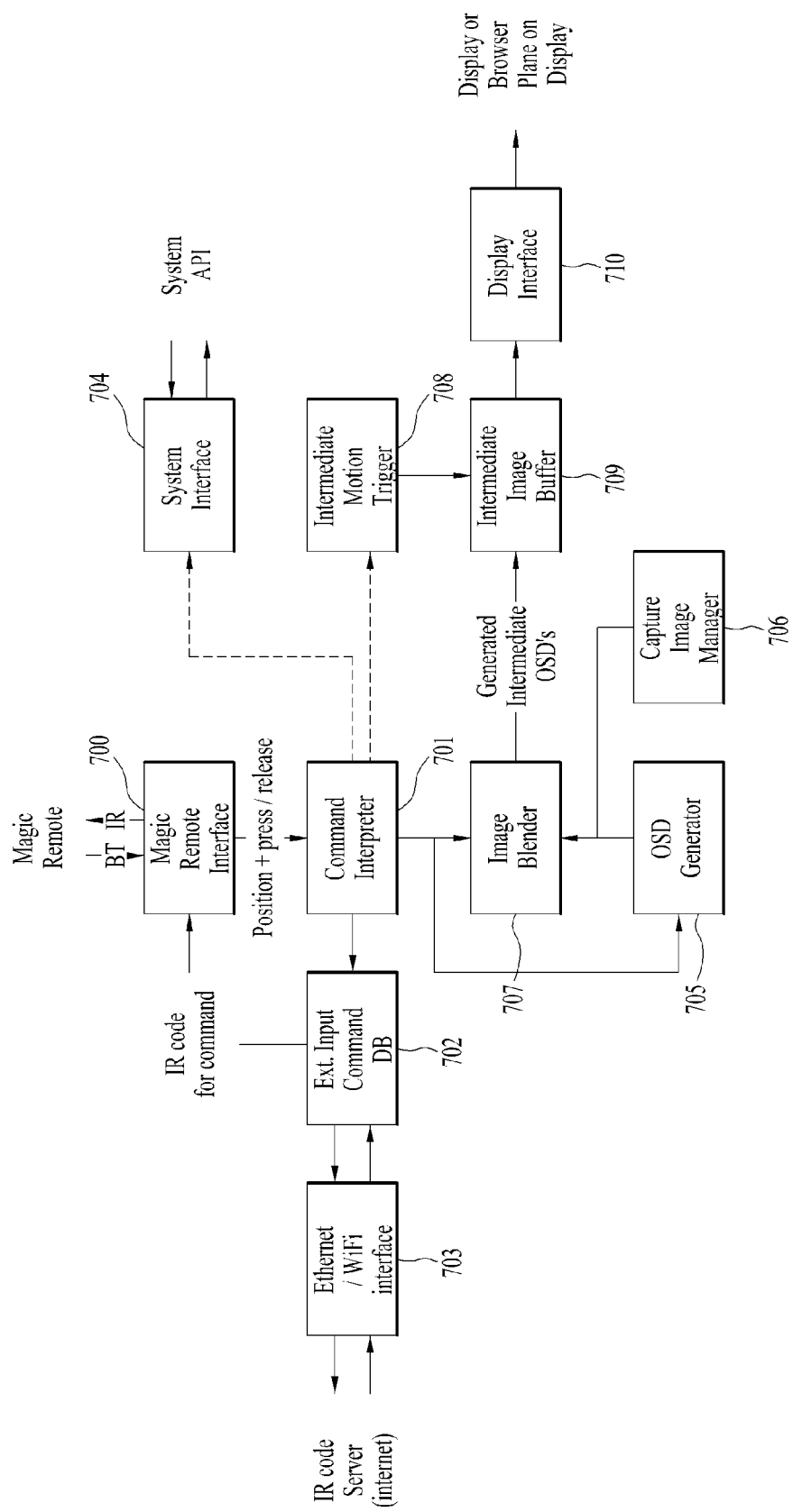
FIG. 7 illustrates a configuration of the platform of the digital broadcast receiver for the magic remote controller according to an embodiment of the present invention.

FIG. 7 illustrates a configuration of the platform of the digital broadcast receiver for the magic remote controller according to an embodiment of the present invention.

The software platform of the digital broadcast receiver for the magic remote controller may include a magic remote controller interface 700, a command interpreter 701, an external input command database 702, an Ethernet/WiFi interface 703, a system interface 704, an OSD generator 705, a capture image manager 706, an image blender 707, an intermediate motion trigger 708, an intermediate image buffer 709 and/or a display interface 710.

The magic remote controller interface 700 is an interface between the magic remote controller and the digital broadcast receiver. The magic remote controller interface 700 may receive information on the position and motion of the pointer according to user command input and information on whether the button on the magic remote controller is pressed.

The command interpreter 701 may interpret the user command on the basis of the position and motion of the pointer and whether the button is pressed and transmit the interpreted command to the system. The command interpreter 701 may generate phased images corresponding to the interpreted command and control the phased image to be smoothly displayed by controlling the intermediate motion trigger 708. The command interpreter 701 may manage a UI related to a current input state such as channel information, a view mode, volume or the like.

The external input command database 702 may extract an IR code for controlling an external device from the digital broadcast receiver when the external device is present. The IR code for controlling the external device is generated when the digital broadcast receiver receives information on the position and motion of the magic remote controller. The external input command database 702 may transmit the extracted IR code to the magic remote controller and the magic remote controller may transmit the received IR code as an internal IR output.

The Ethernet/WiFi interface 703 may operate as an interface in the platform when the Ethernet and/or WiFi are used.

The system interface 704 may control execution of functions of the digital broadcast receiver by transmitting software information on user command input to the digital broadcast receiver system.

The OSD generator 705 may generate a graphic image screen such as a menu, information window, EPG or the like, which displays information on the user command input.

The capture image manager 706 may manage capture images of broadcast images, which are necessary for screen change.

The image blender 707 may generate phased images. The image blender 707 may generate the phased images by blending OSD generated by the OSD generator 705 and images managed by the capture image manager 706 and store the phased images in the intermediate image buffer 709. The image blender 707 may use a 2D graphic acceleration function.

The intermediate motion trigger 708 may generate a signal for controlling a UI image to be naturally displayed.

The intermediate image buffer 709 may store and output phased UI images.

The display interface 710 may display a generated image on the screen.

Figure 8:
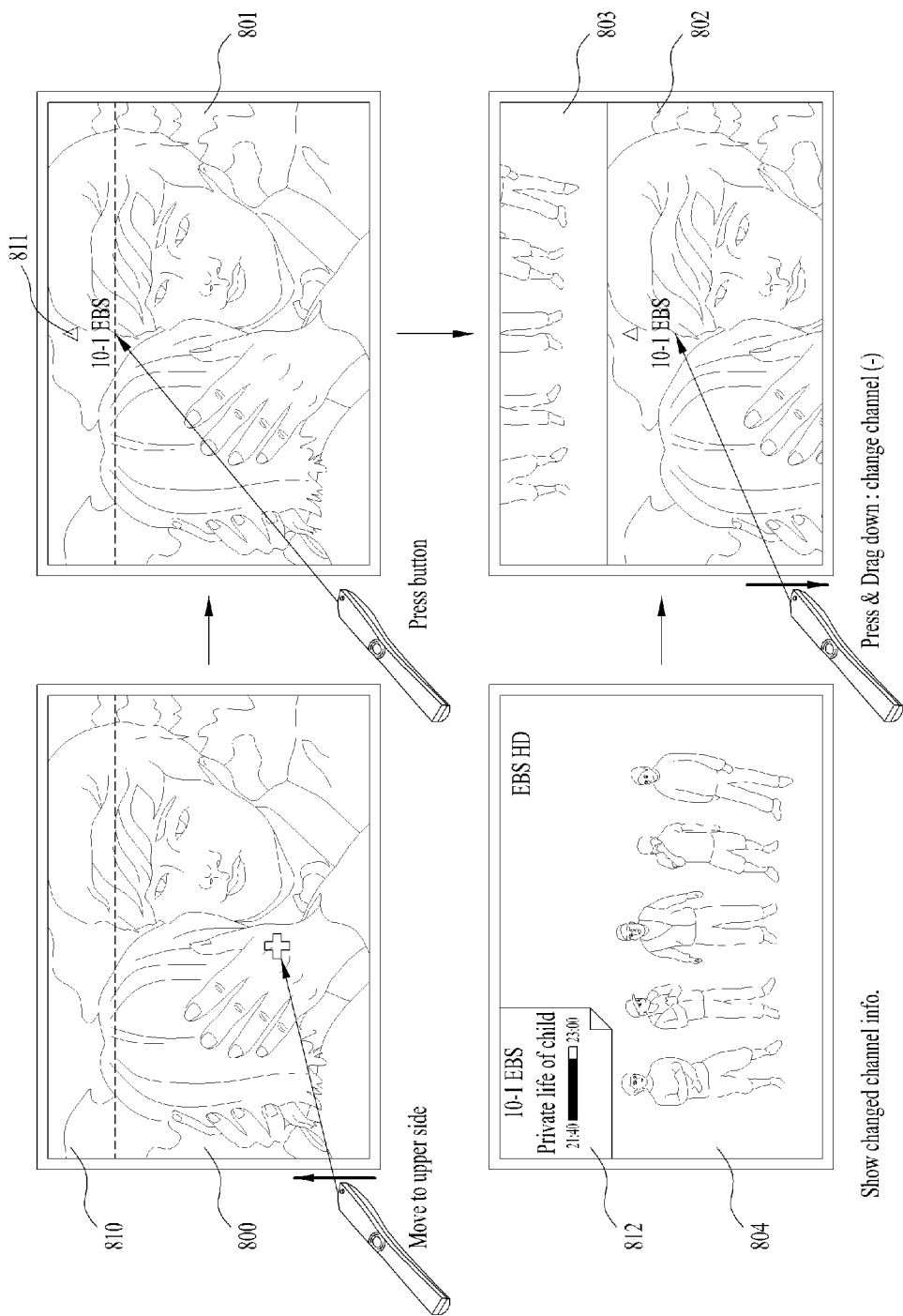
FIG. 8 illustrates a channel change scenario according to an embodiment of the present invention.

FIG. 8 illustrates a channel change scenario according to an embodiment of the present invention.

Figure 9:
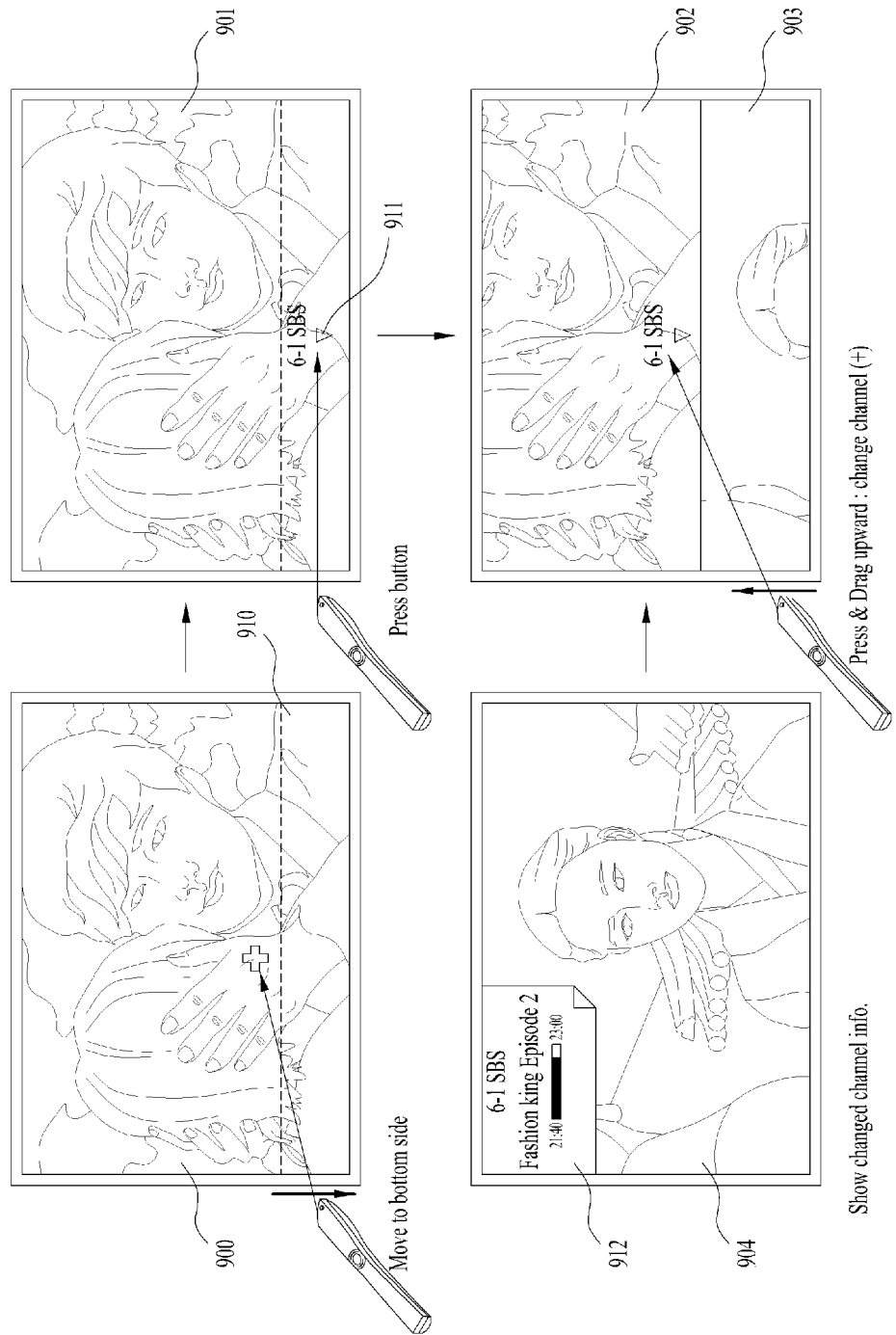
FIG. 9 illustrates a channel change scenario according to another embodiment of the present invention.

FIG. 9 illustrates a channel change scenario according to another embodiment of the present invention.

The embodiment illustrated in FIG. 8 shows a process of changing from a currently broadcast channel to a neighboring upper channel.

The embodiment illustrated in FIG. 9 shows a process of changing from a currently broadcast channel to a neighboring lower channel.

When the pointer of the magic remote controller is moved to a side area of the screen, OSD with respect to channel change or input change may be displayed on the screen. The side area may be set as a region spaced apart from the edge of the screen by a predetermined distance and used to recognize the position of the magic remote controller. The predetermined distance may be changed according to design.

A pointer sensing region 810 or 910 may be set on a screen 800 or 900 on which a broadcast image is displayed, having a predetermined distance from the upper/lower edge of the screen. When the pointer of the magic remote controller is located in the pointer sensing region 810 or 910, OSDs 811 and 812 or 911 and 912 with respect to the neighboring upper/lower channel may be displayed on the basis of the position of the pointer. The OSDs 811 and 812 or 911 and 912 with respect to the channel may include a channel number and a channel name.

When the button of the magic remote controller is pressed while the OSDs 811 and 812 or 911 and 912 with respect to the channel is displayed, a channel change command signal is input. The displayed broadcast image may be stopped according to the channel change command signal. Then, the video frame of the stopped broadcast image is captured, a broadcast image corresponding to the upper/lower channel is captured and loaded.

When the magic remote controller is moved with the button thereof pressed to drag the pointer on the screen, the captured video frame 802 or 902 is moved in the drag direction. Here, the capture image 803 or 903 of the broadcast image corresponding to the neighboring channel may be displayed in a vacant area of the screen, which is generated when the captured video frame 802 or 902 is moved according to drag operation. That is, the captured video frame 802 or 902 and the capture image 803 or 903 of the broadcast image of the neighboring channel may be blended to form phased images in a screen transition procedure. Image blending may be performed on the basis of 2D graphics acceleration.

Specifically, the result of FIG. 8 or 9 may be obtained according to drag direction. When the pointer is dragged downward with the button of the magic remote controller pressed, the capture image 803 corresponding to the neighboring upper channel may be blended with the captured video frame 802 and displayed, as shown in FIG. 8. When the pointer is dragged upward with the button of the magic remote controller pressed, the capture image 903 corresponding to the neighboring lower channel may be blended with the captured video frame 902 and displayed, as shown in FIG. 9.

When the button of the magic remote controller is released after the drag operation, the previous channel may be maintained or transition to the neighboring channel may be performed. Here, a release time is predicted in consideration of acceleration of movement of the pointer on the screen according to movement of the magic remote controller. A channel transition result may depend on a blended image state at the predicted release time.

For example, when more than 50% of the total area of the blended image corresponds to the captured video frame 802 or 902 of the previously displayed broadcast image, the broadcast image of the previous channel can be displayed. When more than 50% of the total area of the blended image corresponds to the capture image 803 or 903 of the neighboring upper/lower channel, transition to the neighboring upper/lower channel can be performed. When the previous channel is maintained or changed to the neighboring channel after button release, information 812 or 912 on the previous channel or changed channel may be displayed as OSD and a broadcast image 804 or 904 of the corresponding channel may be displayed.

Figure 10:
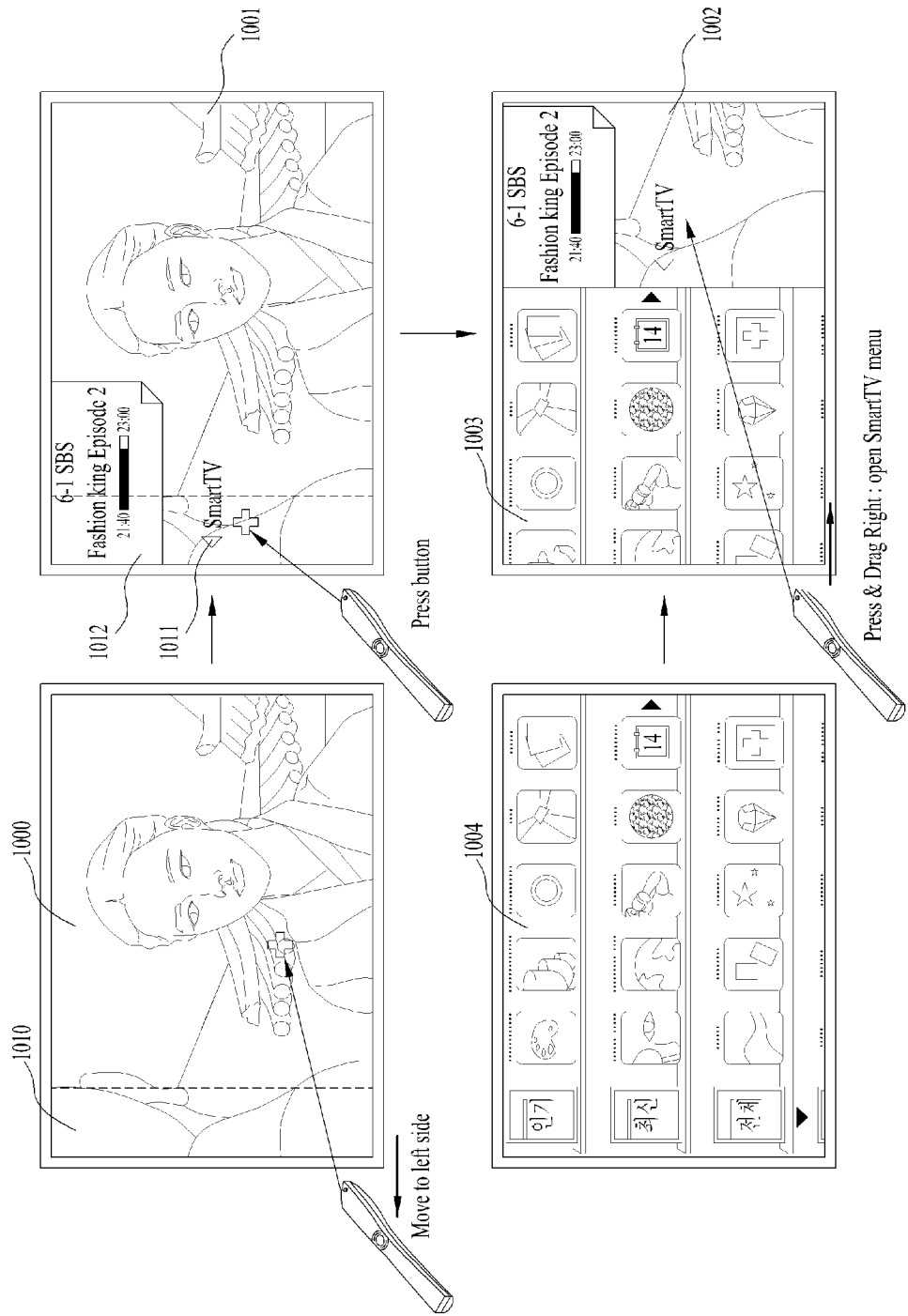
FIG. 10 illustrates an input change scenario according to an embodiment of the present invention.

FIG. 10 illustrates an input change scenario according to an embodiment of the present invention.

Figure 11:
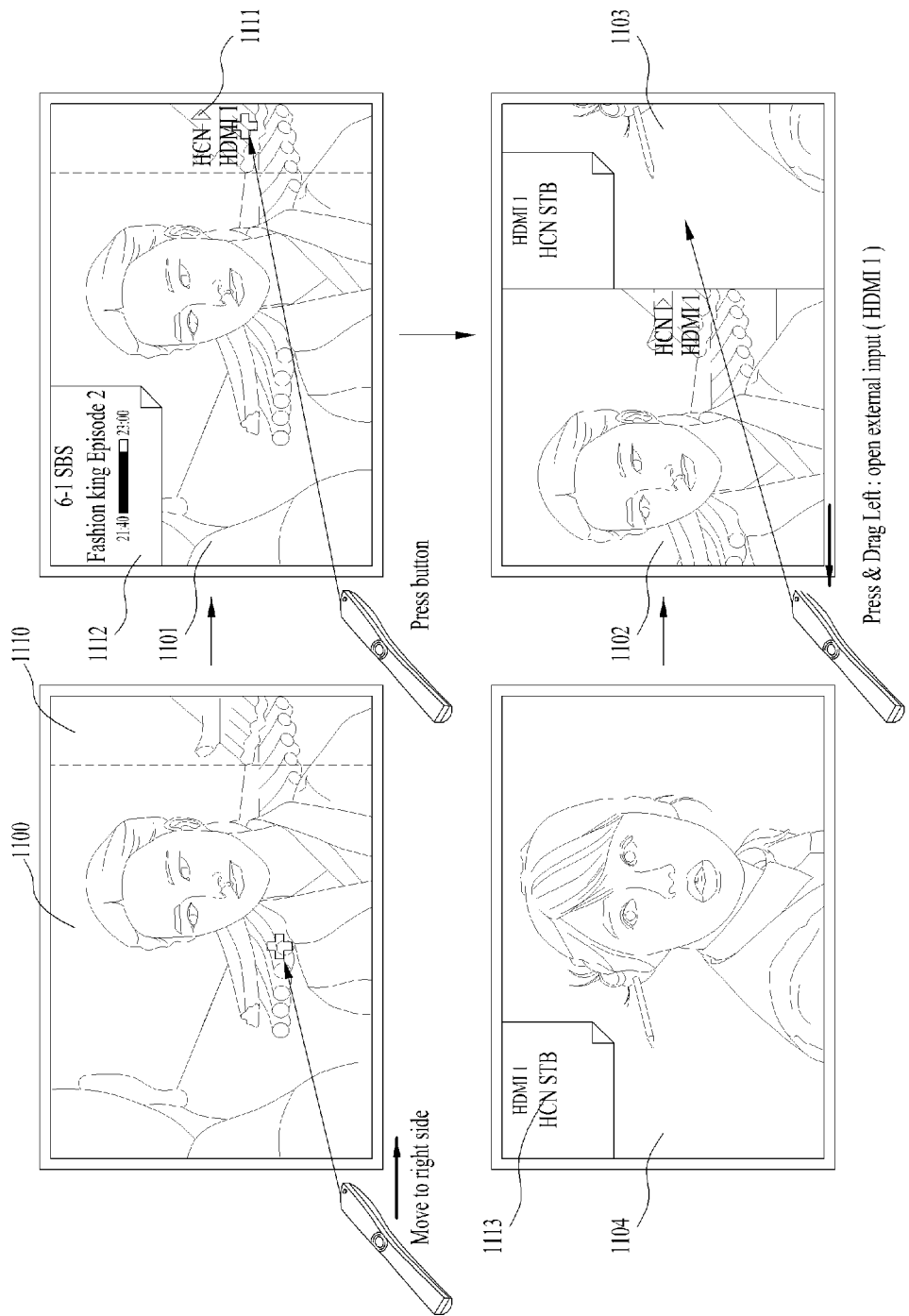
FiG. 11 illustrates an input change scenario according to another embodiment of the present invention.

FIG. 11 illustrates an input change scenario according to another embodiment of the present invention.

The embodiment illustrated in FIG. 10 shows input change to a smart TV application menu (referred to as a smart TV menu hereinafter) during display of a broadcast image.

The embodiment illustrated in FIG. 11 shows change to external input during display of a broadcast image.

A pointer sensing region 1010 or 1110 may be set on a screen 1000 or 1100 on which a broadcast image is displayed, having a predetermined distance from the upper/lower edge of the screen. When the pointer of the magic remote controller is located in the pointer sensing region 1010 or 1110, OSD 1011 or 1111 with respect to input change such as smart TV menu/external input may be displayed on the basis of the position of the pointer. Simultaneously, OSD 1012 or 1112 indicating information about a currently broadcast program may be displayed. The OSD 1111 with respect to external input may include an external input name or an external device name.

When the button of the magic remote controller is pressed while the OSD 1011 or 1111 with respect to input change is displayed, an input change command signal is input. The displayed broadcast image may be paused according to the input change command signal. Then, the video frame of the paused broadcast image is captured and an image corresponding to the smart TV menu or external input is captured and loaded.

When the magic remote controller is moved with the button thereof pressed to drag the pointer on the screen, the captured video frame 1002 or 1102 is moved in the drag direction. Here, the image 1003 or 1103 corresponding to the smart TV menu or external input may be displayed in a vacant area of the screen, which is generated when the captured video frame 1002 or 1102 is moved according to drag operation. That is, the captured video frame 1002 or 1102 and the image 1003 or 1103 corresponding to the smart TV menu 803 or external input may be blended to form phased images in a screen change process. Image blending may be performed on the basis of 2D graphics acceleration.

Specifically, the result of FIG. 10 or 11 may be obtained according to drag direction. When the pointer is dragged to the right with the button of the magic remote controller pressed, the smart TV menu image 1003 may be blended with the captured video frame 1002 and displayed, as shown in FIG. 10. When the pointer is dragged to the left with the button of the magic remote controller pressed, the external input image 1003 may be blended with the captured video frame 1102 and displayed, as shown in FIG. 11.

When the button of the magic remote controller is released after the drag operation, the previous channel may be maintained or input change to the smart TV menu or external input may be performed. Here, a release time is predicted in consideration of acceleration of movement of the pointer on the screen according to movement of the magic remote controller. A channel transition result may depend on blended image state at the predicted release time.

For example, when more than 50% of the total area of the blended image corresponds to the captured video frame 1002 or 1102 of the previously displayed broadcast image, the broadcast image of the previous channel can be displayed. When more than 50% of the total area of the blended image corresponds to the image 1003 or 1103 corresponding to the smart TV menu or external input, input change to the corresponding image can be performed. When the previous channel is maintained after button release, information on the previous channel may be displayed as OSD and the broadcast image of the previous channel may be displayed. Upon input change to the smart TV menu, the smart TV menu image may be displayed on the overall area of the screen. Upon change to the external input, OSD representing information 1113 on the external input may be displayed and the image corresponding to the external input may be displayed.

Figure 12:
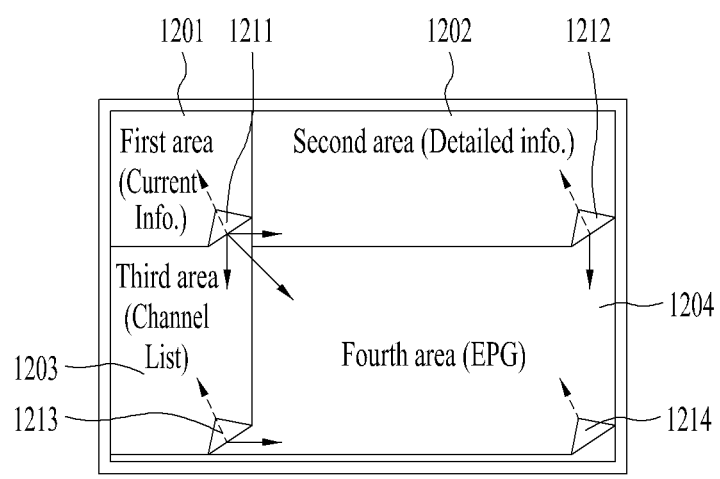
FIG. 12 illustrates a configuration of an EPG display screen according to an embodiment of the present invention.

FIG. 12 illustrates a configuration of an EPG display screen according to an embodiment of the present invention.

Referring to FIG. 12, the EPG display screen may be segmented into a first area 1201 displaying OSD with respect to current channel and input information, a second area 1202 displaying OSD with respect to detailed information on the current channel and input, a third area 1203 displaying OSD with respect to a channel list and a fourth area 1204 displaying OSD with respect to EPG.

Upon display of the OSD with respect to the current channel and input information in the first area 1201, a pointer 1211 capable of dragging the OSD may be displayed in the form of a bookmark, arrow or triangle along with the OSD.

Upon display of the OSD with respect to the detailed information on the current channel and input in the second area 1202, a pointer 1212 capable of dragging the OSD may be displayed in the form of a bookmark, arrow or triangle along with the OSD.

Upon display of the OSD with respect to the channel list in the third area 1203, a pointer 1213 capable of dragging the OSD may be displayed in the form of a bookmark, arrow or triangle along with the OSD.

Upon display of the OSD with respect to the EPG in the fourth area 1204, a pointer 1214 capable of dragging the OSD may be displayed in the form of a bookmark, arrow or triangle along with the OSD.

Figure 13:
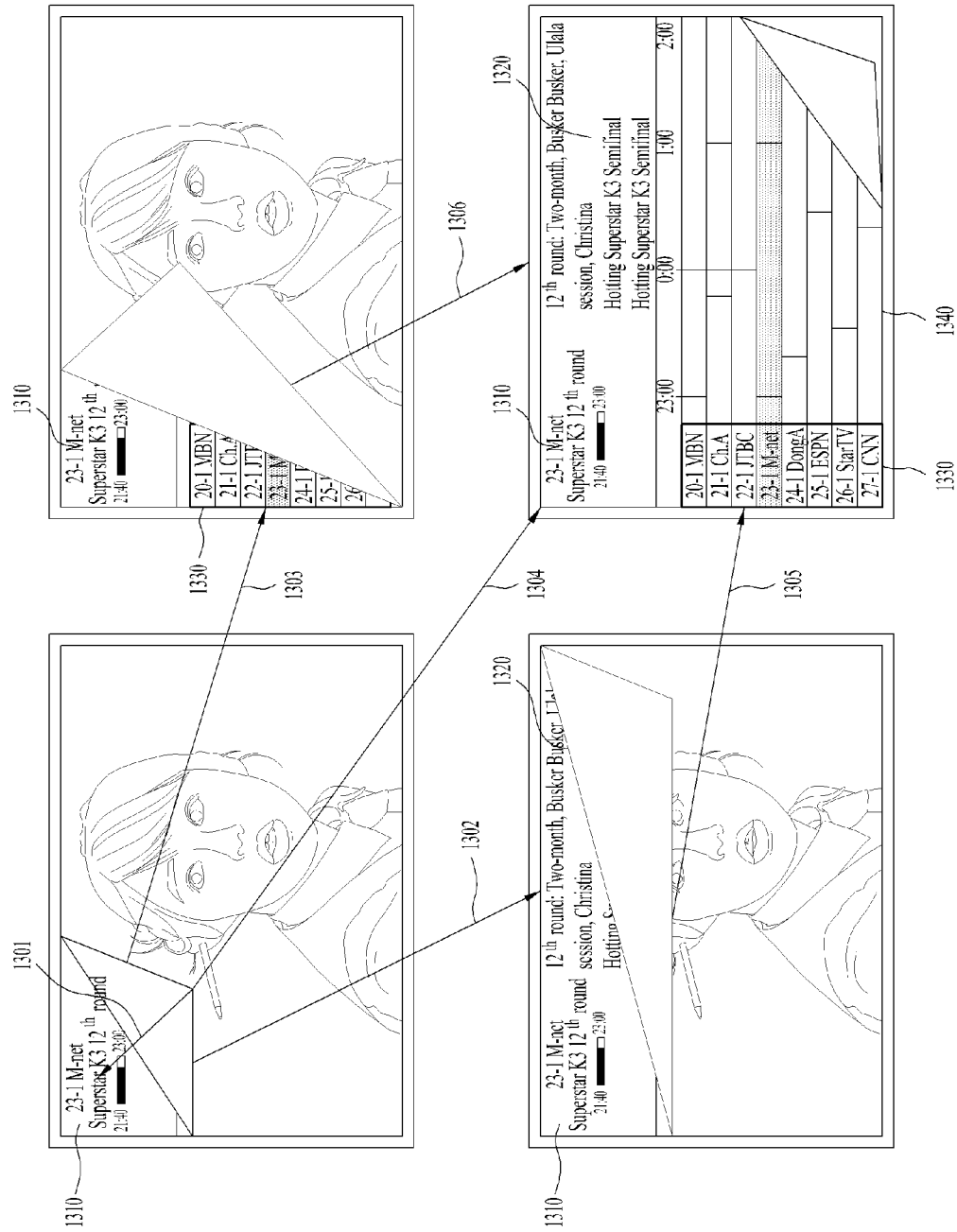
FIG. 13 illustrates an EPG display scenario according to an embodiment of the present invention.

FIG. 13 illustrates an EPG display scenario according to an embodiment of the present invention.

When the magic remote controller is moved to move the pointer on the screen to the first area or the button of the magic remote controller is pressed, OSD 1310 with respect to current channel and input information may be displayed in the first area (1301). When the pointer is dragged to upper left, the current channel and input information OSD 1310 may disappear from the screen. When the pointer is dragged to the second area, that is, to the right, OSD 1320 with respect to detailed information on the current channel and input may be displayed (1302). When the pointer is dragged to the third area, that is, to lower left, OSD 1330 with respect to the channel list may be displayed (1303). When the pointer is dragged to the fourth area, that is, to the lower right, EPG OSD 1340 may be displayed (1304).

The OSD 1320 with respect to the detailed information on the current channel and input may be displayed in the second area (1302). When the pointer is dragged to the left, the OSD 1320 may disappear. The EPG OSD 1340 may be displayed (1306) when the pointer is dragged to the fourth area, that is, downward (1306).

The channel list OSD 1330 may be displayed in the third area (1303). The channel list OSD may disappear when the pointer is dragged upward. The EPG OSD 1340 may be displayed (1306) when the pointer is dragged to the fourth area, that is, to the right.

A user may drag the pointer by moving the magic remote controller on the channel list OSD 1330 so as to search channels. In addition, the user may select or change a channel by locating the pointer on the corresponding channel and clicking the pointer. In the case of channel change, the channel list OSD may be maintained or disappear.

When the button of the magic remote controller is released, the EPG 1340 may be displayed on the screen along with the current channel and input information 1310, detailed information 1320 and channel list 1330. The user may check a program schedule through the EPG 1340.

The EPG OSD 1340 may be displayed in the fourth area. The EPG OSD 1340 may disappear when the pointer is dragged to the upper left. The OSD 1320 representing the detailed information on the current channel and input may be displayed when the pointer is dragged to the second area, that is, upward. The channel list OSD 1330 may be displayed when the pointer is dragged to the third area, that is, to the left.

The user may drag the pointer by moving the magic remote controller on the displayed EPG 1340 and the channel list OSD 1330 so as to search channels. Specifically, according to preferred examples 1330 and 1340 of the present invention, shown in FIG. 13, the channel list OSD 1330 can be searched by dragging the pointer up and down and a time line indicating program scheduling can be searched by dragging the pointer to the left and right.

In addition, the user may display additional information on the OSD 1320 representing the detailed information on the current channel and input in the third area by clicking the title of a desired program on the EPG OSD 1340. The user may perform reservation and recording of a program through the displayed additional information.

In the EPG display UI described with reference to FIG. 13, the currently displayed broadcast image can be continuously displayed without being stopped. All OSDs 1310, 1320, 1330 and 1340 related to the EPG may be displayed in a transparent manner such that a displayed background image can be seen. Transparent OSD may be implemented according to alpha blending.

Display of the OSDs 1310, 1320, 1330 and 1340 during display of the background image may be implemented according to a 2D graphics acceleration engine.

Figure 14:
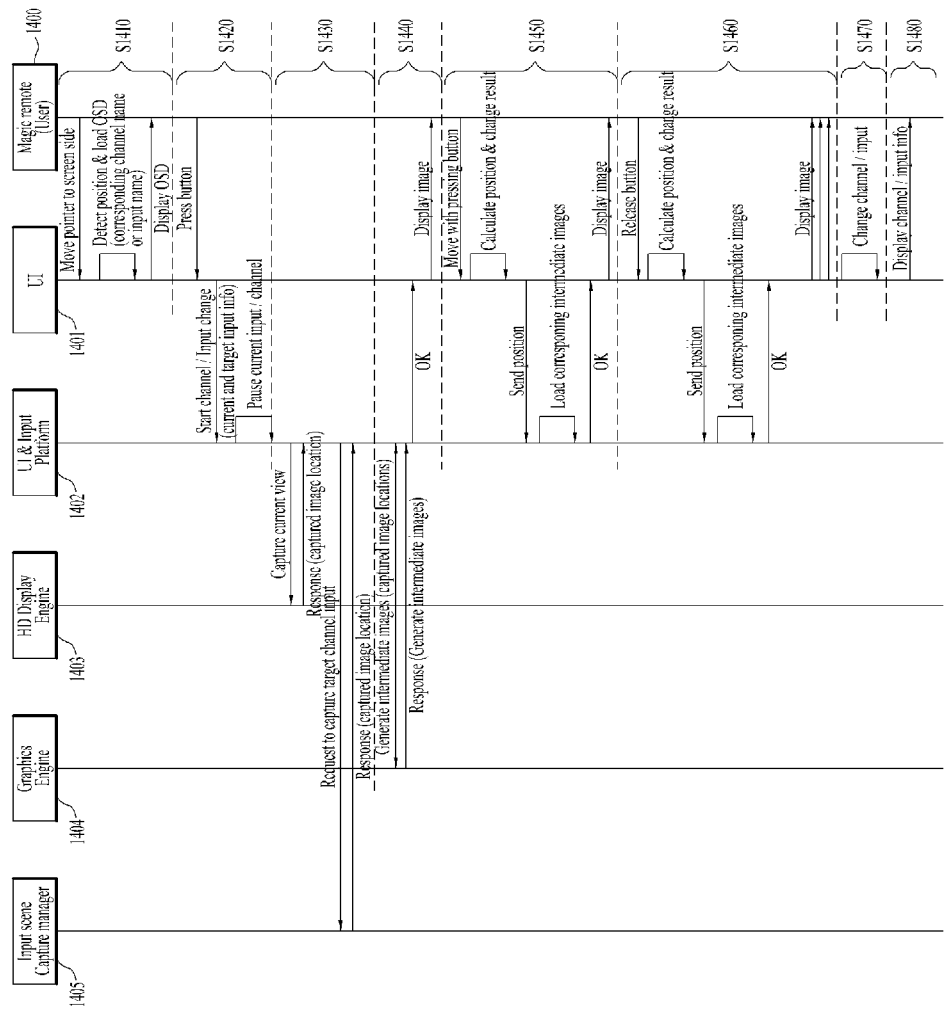
FIG. 14 is a flowchart illustrating a process of controlling a digital broadcast receiver using a magic remote controller according to an embodiment of the present invention.

FIG. 14 is a flowchart illustrating a process of controlling a digital broadcast receiver using a magic remote controller according to an embodiment of the present invention. The flowchart of FIG. 14 shows a process of controlling the digital broadcast receiver to implement channel/input change and EPG display UIs illustrated in FIGS. 8 to 13.

Referring to FIG. 14, the digital broadcast receiver using the magic remote controller 1400 may include a UI 1401, a UI & input platform 1402, an HD display engine 1403, a graphics engine 1404 and/or an input scene capture manager 1405.

When a command signal from a user is input to the magic remote controller 1400, information on the position and movement of the magic remote controller 1400 and the user command signal may be transmitted to the UI 1400 of the digital broadcast receiver through a Bluetooth channel. When the user moves the magic remote controller 1400 to a specific side region of the screen, the UI 1401 may calculate the position of the pointer through coordinates. OSD with respect to channel/input change or EPG may be displayed at the calculated position (S1410)

When the user presses the button of the magic remote controller 1400, a user command signal with respect to channel/input change or EPG display is input to the UI 1401. Display of a currently displayed broadcast image may be paused according to the user command signal. Simultaneously, the UI 1401 may transmit, to the platform 1402, information on the currently displayed broadcast image and a target input image along with channel/input change start information. The target input image may be a broadcast image of a neighboring channel, a smart TV menu, an image corresponding to external input or an EPG display image (S1420).

The platform 1402 may capture still images of the currently displayed broadcast image and the target input image through the HD display engine 1403 and the input scene capture manager 1405 (S1430).

The platform 1402 may generate phased images necessary for screen change using the graphics engine 1404 (S1440).

When the user drags the pointer while pressing the button of the magic remote controller 1400, the UI 1401 may calculate the position of the pointer and acceleration information and transmit the calculation result to the platform 1402. The platform 1402 may display an image corresponding to the position and movement of the pointer on the screen through the UI 1401 (S1450).

When the user releases the button of the magic remote controller 1400, the UI 1401 calculates the position of the pointer and acceleration information. The UI 1401 determines whether the channel/input is changed or EPG is displayed through the calculated position and acceleration information. The platform 1402 may display phased images and complete screen change effect (S1460).

Upon completion of screen change effect, the UI 1401 may perform channel/input change or EPG display (S1470).

Upon completion of channel/input change, OSD with respect to information on the corresponding channel/input may be displayed (S1480).

Figure 15:
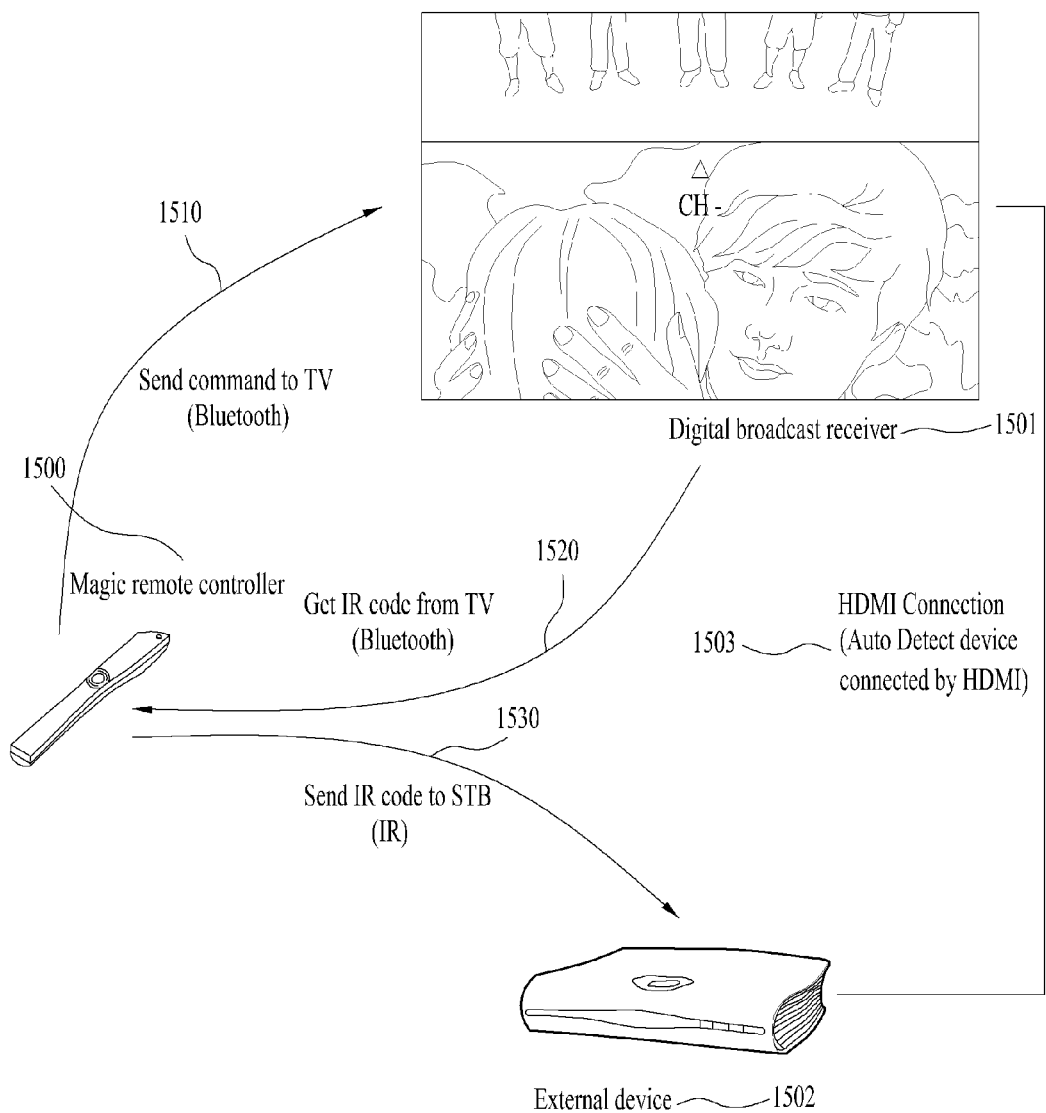
FIG. 15 illustrates a configuration of an apparatus for implementing a magic remote controller UI according to an embodiment of the present invention.

FIG. 15 illustrates a configuration of an apparatus for implementing a magic remote controller UI according to an embodiment of the present invention.

The apparatus for implementing the magic remote controller UI according to the present invention may include a magic remote controller 1500, a digital broadcast receiver 1501 and/or an external device 1502. Preferred examples of the external device 1502 may include cable, a set-top box, a BluRay player and/or a game console. The digital broadcast receiver 1501 and the external device 1502 may be connected (1530). Preferred examples of connection between the digital broadcast receiver 1501 and the external device 1502 may include connection according to HDMI.

The digital broadcast receiver has evolved to provide a TV broadcasting function using cable, Internet services, entertainment services and various multimedia information provision services in addition to TV broadcasting functions using aerial propagation. Accordingly, user experience in controlling the TV broadcasting function is required even when an external device connected to the digital broadcast receiver is controlled.

According to the apparatus for implementing the magic remote controller UI illustrated in FIG. 15, even the external device 1502 connected to the digital broadcast receiver 1501 can be controlled using the magic remote controller and the UI consistent with TV use experience can be provided even when the external device 1502 is connected to the digital broadcast receiver 1501.

A Bluetooth channel and an IR channel may be used for a signal transmission mechanism among the magic remote controller 1500, the digital broadcast receiver 1501 and the external device 1502. Since the external device 1502 cannot directly recognize the position and motion of the magic remote controller 1500, the digital broadcast receiver converts information on the position and motion of the magic remote controller 1500 into an IR code and sends the IR code to the magic remote controller. The magic remote controller sends the received IR code to the external device 1502.

When a user command signal is input to the magic remote controller 1500, information on the position and motion of the magic remote controller 1500 and the user command signal may be sent to the digital broadcast receiver 1501 through the Bluetooth channel (1510). The UI of the digital broadcast receiver 1501 can detect the type of the external device 1502 in an external input mode. When connection 1503 of the digital broadcast receiver 1501 and the external device 1502 is achieved by HDMI, a function of detecting the code of the external device 1502 can be supported. When other connection schemes are used, the user may directly input the code.

The digital broadcast receiver 1501 may send the IR code to the magic remote controller 1500 using the Bluetooth channel (1520). The IR code corresponds to a remote control code of the external device 1502 and may be obtained from an IR code database included in the digital broadcast receiver 1501 or the Internet.

The magic remote controller 1500 may send the IR code to the external device 1502 using IR output. Upon reception of the IR code, the external device 1502 can recognize the information on the position and motion of the magic remote controller and the user command signal. Accordingly, a function corresponding to the user command signal can be executed after the external device 1502 receives the IR code.

Figure 16:
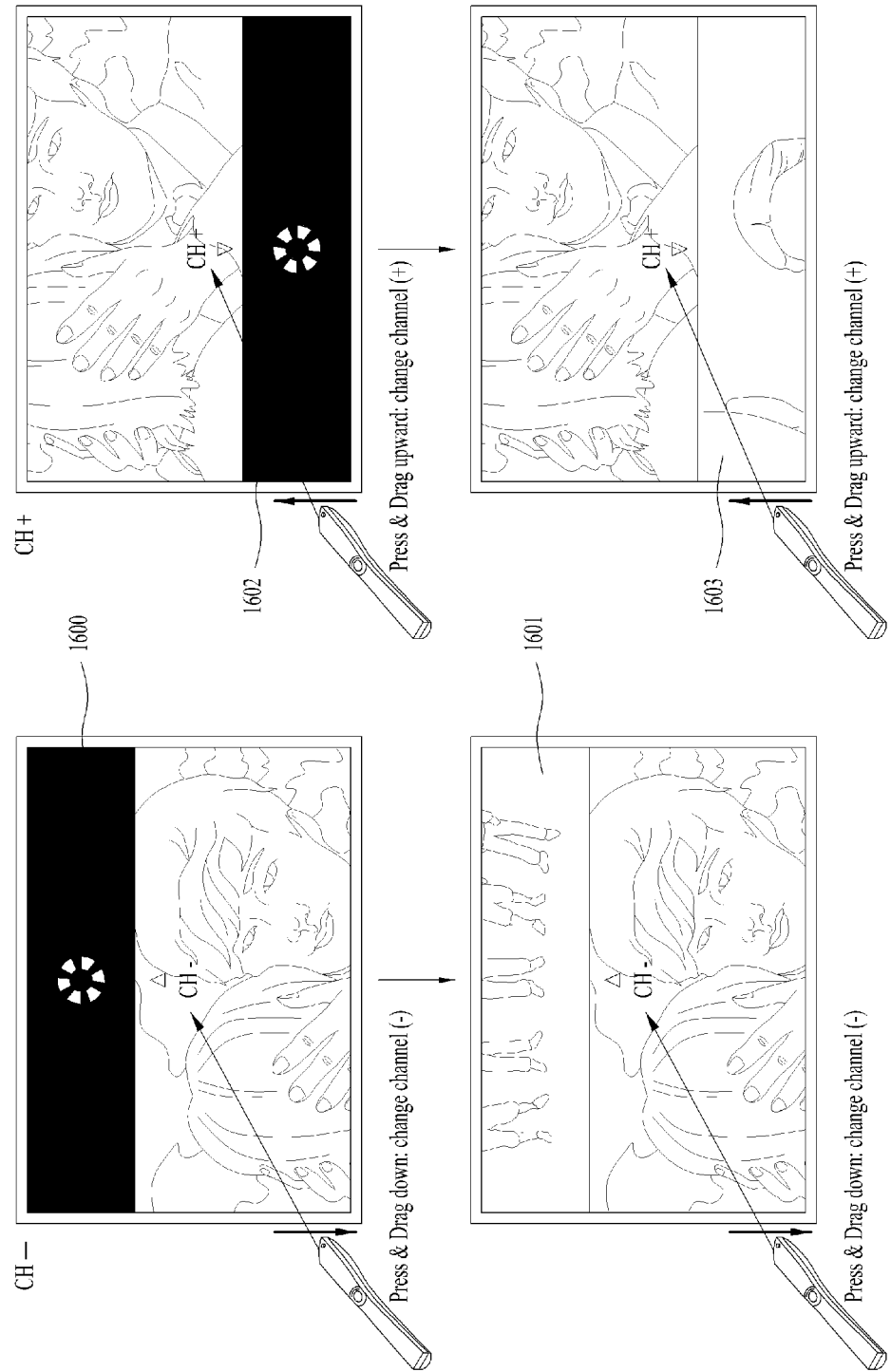
FIG. 16 illustrates a channel/input change scenario according to another embodiment of the present invention.

FIG. 16 illustrates a channel/input change scenario according to another embodiment of the present invention.

The embodiment illustrated in FIG. 16 discloses a channel change process when an external device is connected to the digital broadcast receiver.

In the channel change and input change process when the external device is connected to the digital broadcast receiver, the same UI as that of a digital broadcast receiver receiving broadcast signals according to aerial propagation may be implemented. That is, channel/input change in image reproduction by the external device can be performed in the same manner as channel/input change in the digital broadcast receiver for the magic remote controller, described with reference to FIGS. 8 to 11.

In channel/input change in image reproduction by the external device, however, a capture image of a target input image is not immediately loaded and black mute screens 1600 and 1602 can be loaded. That is, it is possible to display the black mute screens 1600 and 1602 instead of capture images 1601 and 1603 of the target input image for a screen change standby time of about one to two seconds. The capture images 1601 and 1603 of the target input image can replace the black mute screens 1600 and 1602 after the lapse of the screen change standby time. When it is difficult to display the capture images 1601 and 1603 of the target input image, the target input image may be immediately displayed upon completion of channel/input change.

Figure 17:
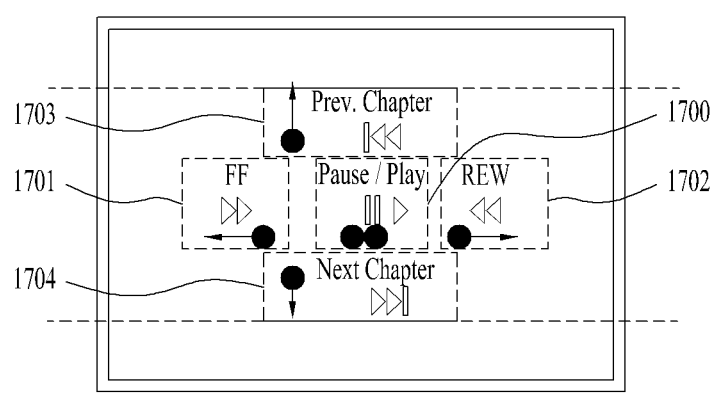
FIG. 17 illustrates a composition of a trick mode display screen according to an embodiment of the present invention.

FIG. 17 illustrates a composition of a trick mode display screen according to an embodiment of the present invention.

Referring to FIG. 17, the trick mode display screen may include OSDs with respect to pause/play 1700, fast forward (FF) 1701, rewind (REW) 1702, previous chapter 1703 and next chapter 1704. The OSDs 1700, 1701, 1702, 1703 and 1704 shown in FIG. 17 may be displayed along with played images on the screen on which the played images are displayed.

Figure 18:
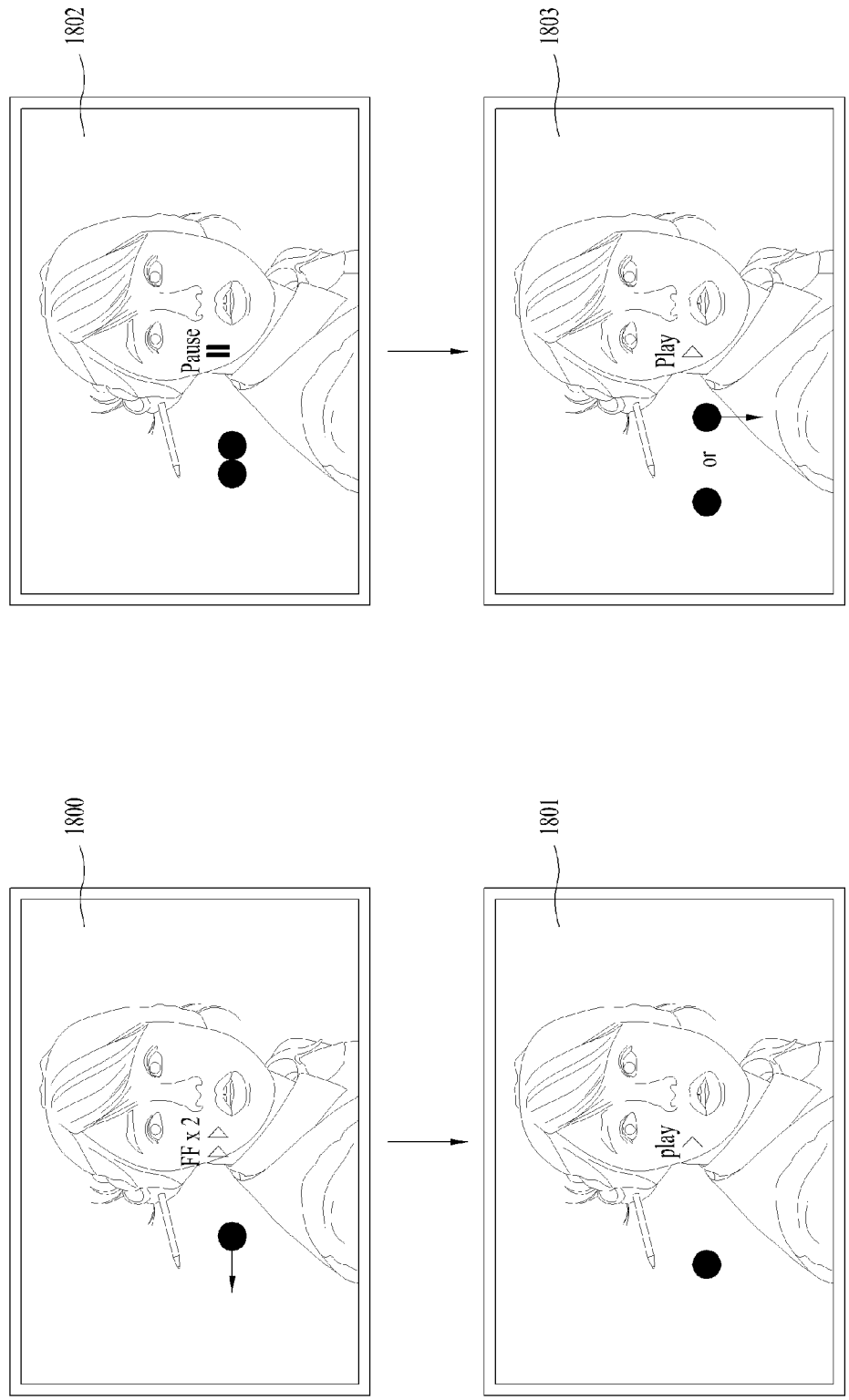
FiG. 18 illustrates a trick mode scenario according to an embodiment of the present invention.

FIG. 18 illustrates a trick mode scenario according to an embodiment of the present invention.

When the button of the magic remote controller is double clicked, "play" and "pause" can be toggled (1802).

When the pointer corresponding to the magic remote controller is dragged to the left and right with the button of the magic remote controller pressed and then the button is released during playback of images, images being played at a normal speed can be played at an increased speed (1800). Specifically, according to the example illustrated in FIG. 18, a fast forward command signal can be transmitted and FF OSD representing a fast forward function can be displayed when the pointer is dragged to the left (1800). When the fast forward command signal is transmitted twice or more by repeatedly dragging the pointer to the left, a fast forward speed can be increased. On the contrary, a rewind command signal can be transmitted and REW OSD representing a rewind function can be displayed when the pointer is dragged to the right. When the rewind command signal is transmitted twice or more by repeatedly dragging the pointer to the right, a rewind speed can be increased. When the button of the magic remote controller is clicked during fast playback, the fast playback mode changes to the normal playback mode.

When the pointer is dragged upward/downward with the button of the magic remote controller pressed and then the button is released during playback of images, chapter change can be performed (1803). Specifically, a command signal for changing to the previous chapter can be transmitted and OSD representing the previous chapter can be displayed when the pointer is dragged upward. On the contrary, a command signal for changing to the next chapter can be transmitted and OSD representing the next chapter can be displayed when the pointer is dragged downward.

When the pointer is dragged in one direction and then dragged again in a different direction with the button of the magic remote controller pressed, a command signal according to the first drag can be ignored whereas the final command signal according to the final drag can be considered to be valid. Accordingly, OSD according to the first drag can be deleted and OSD according to the final drag can be displayed.

Figure 19:
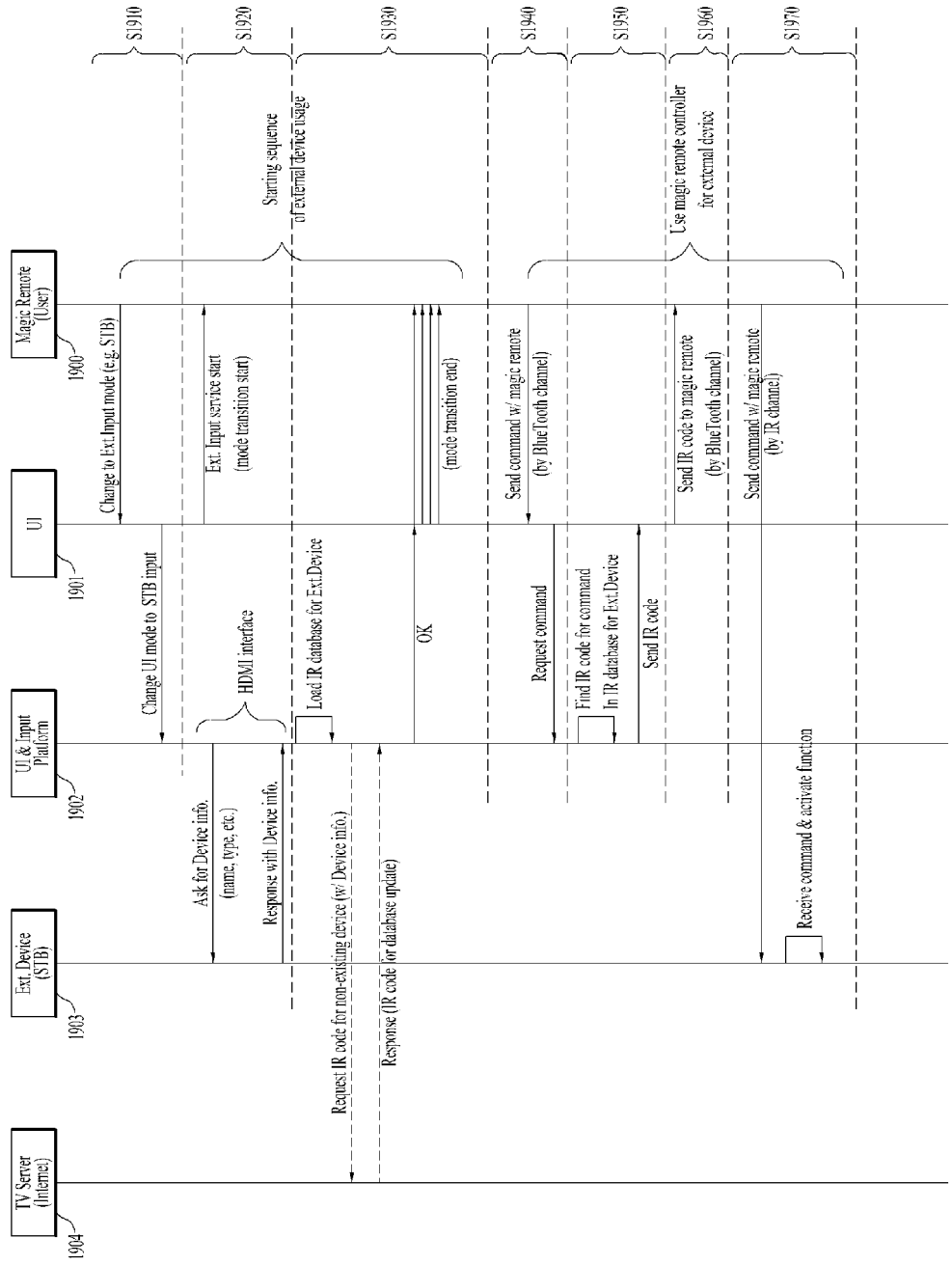
FIG. 19 is a flowchart illustrating a process of controlling an external device using a magic remote controller according to an embodiment of the present invention.

FIG. 19 is a flowchart illustrating a process of controlling an external device using a magic remote controller according to an embodiment of the present invention.

The flowchart illustrated in FIG. 19 shows a UI implementation mechanism of an apparatus for implementing a magic remote controller UI when the external device is connected to the digital broadcast receiver, which is described with reference to FIGS. 15 to 18.

Referring to FIG. 19, the apparatus for implementing the magic remote controller UI may include a magic remote controller 1900, a UI 1901, a UI & input platform 1902, an external device 1903 and/or a TV server 1904. A preferred example of the external device 1903 may include a set-top box (STB). A preferred example of the TV server 1904 may include the Internet.

The UI implementation mechanism when the external device is connected to the digital broadcast receiver can be divided into an input change process S1910, S1920 and S1930 and an external device using process S1940, S1950, S1960 and S1970.

For input change, the user may input a command signal for changing an input mode of the digital broadcast receiver UI 1901 to an external input mode using the magic remote controller 1900. Upon input of the input mode change command signal, the platform 1902 can change the input mode of the digital broadcast receiver UI 1901 to the external input mode (S1910).

The platform 1902 may read information on the external device 1903 connected to the digital broadcast receiver (S1920). The information on the external device 1903 can be automatically detected when the external device 1903 is connected to the digital broadcast receiver through HDMI and the user can directly input the information on the external device 1903 when the external device 1903 is connected to the digital broadcast receiver through other connection schemes. The information on the external device 1903 may include the name, type, etc. of the external device 1903.

The platform 1902 may search the IR database of the digital broadcast receiver for an IR code corresponding to the external device 1903 (S1930). When the IR database does not include the information on the external device 1903, the TV server 1904 or the Internet may be requested to provide the IR codes or to update the IR database and the IR code may be received (S1930).

Upon input mode change, the external device 1903 may be used through interaction of the magic remote controller 1900, the UI 1902 and the external device 1903.

Upon input of a user command signal to the magic remote controller 1900, information on the position and motion of the magic remote controller 1900 and the user command signal may be send to the UI 1901 of the digital broadcast receiver through a Bluetooth channel. The UE 1901 may deliver the information on the position and motion of the magic remote controller and the user command signal to the platform 1902 (S1940).

The platform 1902 may search the IR database for the IR code corresponding to the external device 1903 and send the IR code to the UI 1901 (S1950).

The platform 1902 may transmit the IR code to the magic remote controller 1900 through the Bluetooth channel (S1960).

The magic remote controller 1900 may send a user input command signal according to the IR code to the external device 1903 using IR output. The external device 1903 may execute a corresponding function according to the received user input command signal (S1970).

The mechanism (S1970) of executing the function corresponding to the user input command may be achieved through the digital broadcast receiver UI 1401, platform 1402, HD display engine 1403, graphics engine 1404 and/or capture manager 1405 (S1410 to S1480), as shown in FIG. 14.

FIG. 20 is a flowchart illustrating a method for controlling a digital broadcast receiver for a magic remote controller according to an embodiment of the present invention.

Specifically, FIG. 20 illustrates embodiments of the method for controlling a digital broadcast receiver according to the present invention, described with reference to FIGS. 8 to 14.

The magic remote controller can transmit control signals to the digital broadcast receiver through Bluetooth. Here, the control signals may include a first signal representing a state in which the button of the magic remote controller is clicked, a second signal representing a state in which the magic remote controller is dragged with the button thereof clicked and a third signal representing a state in which the button of the magic remote controller is released (S2000).

Specifically, as shown in FIG. 14, a user command signal is input to the magic remote controller 1400, information on the position and motion of the magic remote controller 1400 and the user command signal may be sent to the UI 1401 of the digital broadcast receiver through the Bluetooth channel (S1410).

The position of the magic remote controller may be calculated to sense a control signal (S2001).

Specifically, when the user moves the magic remote controller to a specific side area of the screen, the UI can calculate the position of the pointer through coordinates, as illustrated in FIG. 14. OSD with respect to channel/input change or EPG may be displayed at the calculated position (S1410). When the user presses the button of the magic remote controller 1400, a user command signal with respect to channel/input change or EPG display is input to the UI 1401 (S1420). The position and motion of the magic remote controller can be indicated through the pointer on the screen. When the second signal is received, the pointer may be displayed being moved in a direction in which the magic remote controller is moved (S2002).

Specifically, as illustrated in FIG. 14, when the user moves the magic remote controller 1400 while pressing the button thereof (drag) according to the second signal, the UI 1401 can calculate the position and acceleration information of the pointer and send the calculation result to the platform 1402 (S1450).

Whether predetermined screen change is performed may be determined according to the control signal (S2003).

Specifically, as illustrated in FIG. 14, when the user releases the button of the remote controller 1400, the UI 1401 calculates the position and acceleration information of the pointer. The UI 1401 may determine whether channel/input change is performed or EPG is displayed through the calculated position and acceleration information (S1460).

In case of predetermined screen change, a broadcast image may be captured (S2004).

Specifically, as illustrated in FIG. 14, the platform 1402 may capture still images of a currently displayed image and a target input image through the HD display engine 1403 and the capture manager 1405 (S1430).

Images necessary for predetermined screen change may be generated using the captured images (S2005).

Specifically, as illustrated in FIG. 14, the platform 1402 may form phased images necessary for screen change using the graphics engine 1404 (S1440). When the user moves the magic remote controller, the platform 1402 may display images corresponding to the position and motion of the pointer on the screen through the UI 1401 (S1450).

The generated images may be displayed on the screen (S2006).

Specifically, as illustrated in FIG. 14, the platform 1402 may display phased images, thereby achieving screen change effect (S1460). When screen change effect is achieved, the UI 1401 may perform channel/input change or EPG display (S1407). Upon completion of channel/input change, OSD with respect to corresponding channel/input information may be displayed (S1408).

FIG. 21 is a flowchart illustrating a method for implementing a magic remote controller UI according to an embodiment of the present invention.

Specifically, FIG. 21 shows embodiments of the method for implementing the magic remote controller UI according to the present invention, described with reference to FIGS. 14 to 19.

The magic remote controller may send control signals to the digital broadcast receiver through Bluetooth. The control signals may include a first signal representing a state in which the button of the magic remote controller is clicked, a second signal representing a state in which the magic remote controller is dragged with the button thereof clicked and a third signal representing a state in which the button of the magic remote controller is released (S2100).

Specifically, as shown in FIG. 19, a user command signal is input to the magic remote controller 1900, information on the position and motion of the magic remote controller 1800 and the user command signal may be sent to the UI 1901 of the digital broadcast receiver through the Bluetooth channel. The UI 1901 may send the information on the position and motion of the magic remote controller and the user command signal to the platform 1902 (S1940).

The digital broadcast receiver may send an IR code corresponding to an external device connected to the digital broadcast receiver to the magic remote controller (S2101).

Specifically, as illustrated in FIG. 19, the platform 1902 may search the IR database for the IR code corresponding to the external device 1903 and send the IR code to the UI 1901 (S1950). The platform 1902 may transmit the IR code to the magic remote controller 1900 through Bluetooth (S1960).

The magic remote controller may transmit the IR code to the external device through IR output (S2102).

Specifically, as shown in FIG. 19, the magic remote controller 1900 may transmit a user input command signal according to the IR code to the external device 1903 using UI output (S1970). The external device 1930 may execute a function corresponding to the received user input command signal.

The position of the magic remote controller may be calculated to sense a control signal (S2103).

Specifically, when the user moves the magic remote controller to a specific side area of the screen, the UI can calculate the position of the pointer through coordinates, as illustrated in FIG. 14. OSD with respect to channel/input change or EPG may be displayed at the calculated position (S1410). When the user presses the button of the magic remote controller 1400, a user command signal with respect to channel/input change or EPG display is input to the UI 1401 (S1420).

The position and motion of the magic remote controller can be indicated through the pointer on the screen. When the second signal is received, the pointer may be displayed being moved in a direction in which the magic remote controller is moved (S2104).

Specifically, as illustrated in FIG. 14, when the user moves the magic remote controller 1400 while pressing the button thereof (drag) according to the second signal, the UI 1401 can calculate the position and acceleration information of the pointer and send the calculation result to the platform 1402 (S1450).

Whether predetermined screen change is performed may be determined according to the control signal (S2105).

Specifically, as illustrated in FIG. 14, when the user releases the button of the remote controller 1400, the UI 1401 calculates the position and acceleration information of the pointer. The UI 1401 may determine whether channel/input change is performed or EPG is displayed through the calculated position and acceleration information (S1460).

In case of predetermined screen change, a broadcast image may be captured (S2106).

Specifically, as illustrated in FIG. 14, the platform 1402 may capture still images of a currently displayed image and a target input image through the HD display engine 1403 and the capture manager 1405 (S1430).

Images necessary for predetermined screen change may be generated using the captured images (S2107).

Specifically, as illustrated in FIG. 14, the platform 1402 may form phased images necessary for screen change using the graphics engine 1404 (S1440). When the user moves the magic remote controller, the platform 1402 may display images corresponding to the position and motion of the pointer on the screen through the UI 1401 (S1450).

The generated images may be displayed on the screen (S2108).

Specifically, as illustrated in FIG. 14, the platform 1402 may display phased images, thereby achieving screen change effect (S1460). When screen change effect is achieved, the UI 1401 may perform channel/input change or EPG display (S1407). Upon completion of channel/input change, OSD with respect to corresponding channel/input information may be displayed (S1408).

Modes for Invention

Various embodiments of the present invention have been described in the best mode.

INDUSTRIAL APPLICABILITY

The present invention relates to a digital broadcast receiver for a magic remote controller and a method of controlling the same. The present invention is not limited to the aforementioned embodiments and various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

The invention claimed is:

1. A digital broadcast receiver for a remote controller, the digital broadcast receiver comprising:
   a receiving unit configured to receive a control signal from the remote controller, wherein the control signal includes a first signal representing a state in which a button of the remote controller is pressed, a second signal representing a drag state of the remote controller with the button of the remote controller pressed, and a third signal representing a state in which the button of the remote controller is released;
   a display unit configured to display an on-screen display (OSD) according to broadcast images and/or the received control signal;
   a processor configured to calculate a position of the remote controller so as to sense the control signal, to indicate the position and motion of the remote controller as a pointer on a screen, to display the pointer while moving the pointer in a direction in which the remote controller is moved when the receiving unit receives the second signal, and to determine whether to perform screen change according to the control signal; and
   a platform configured to capture the broadcast images when the screen change is performed, generate phased images for the screen change using the captured images and control the phased images to be displayed on the screen,
   wherein, when the screen change corresponds to screen change according to channel change, the platform captures a first image with respect to a still image of broadcast images of a current channel and a second image with respect to a still image of broadcast images of a neighboring channel when the receiving unit receives the first signal, the platform sequentially displays the first image, a third image obtained by blending the first and second images and the second image when the receiving unit receives the second signal, and the platform displays the first image or the second image when the receiving unit receives the third signal, and wherein the platform controls areas of the first image and the second image included in the blended third image on the basis of a degree by which the remote controller is dragged according to the second signal, and the processor controls the digital broadcast receiver to tune to the current channel when the area of the first image included in the third image is larger than the area of the second image at a time when the third signal is received and controls the digital broadcast receiver to tune to the neighboring channel when the area of the second image included in the third image is larger than the area of the first image.

2. The digital broadcast receiver according to claim 1, wherein the processor controls information on the neighboring channel to be displayed as an OSD when the pointer is located in an upper or lower area of the screen.

3. The digital broadcast receiver according to claim 1, wherein, when the screen change corresponds to screen change according to an electronic program guide (EPG) display, the screen includes a first area displaying current channel and input information according to the control signal, a second area displaying detailed information on a current channel and input according to the control signal, a third area displaying a channel list according to the control signal and a fourth area displaying the EPG according to the control signal, and the processor displays the first area on the screen when the receiving unit receives the first signal, displays the second or third area on the screen when the receiving unit receives the second signal and displays the fourth area on the screen when the receiving unit receives the third signal.

4. The digital broadcast receiver according to claim 3, wherein, when the receiving unit receives the second signal, the processor displays the second area on the screen when the pointer is moved from the first area to the second area and displays the third area on the screen when the pointer is moved from the first area to the third area.

5. The digital broadcast receiver according to claim 4, wherein channels are searched using the pointer in the third and fourth areas according to the second signal, and a channel is changed according to the first and third signals.

6. An apparatus for implementing a remote controller user interface (UI), the apparatus comprising:

a digital broadcast receiver configured to receive a control signal from the remote controller;

an external device connected to the digital broadcast receiver; and the remote controller configured to receive an infrared (IR) code corresponding to the external device from the digital broadcast receiver when the digital broadcast receiver receives the control signal, and send the received IR code to the external device through IR output, wherein the control signal includes a first signal representing a state in which a button of the remote controller is pressed, a second signal representing a drag state of the remote controller with the button of the remote controller pressed, and a third signal representing a state in which the button of the remote controller is released;

wherein the digital broadcast receiver comprises:

a receiving unit configured to receive the control signal;

a display unit configured to display an on-screen display (OSD) according to broadcast images and/or the received control signal;

a processor configured to calculate a position of the remote controller so as to sense the control signal, to indicate the position and motion of the remote controller as a pointer on a screen, to display the pointer while moving the pointer in a direction in which the remote controller is moved when the receiving unit receives the second signal, and to determine whether to perform screen change according to the control signal; and a platform configured to capture the broadcast images when the screen change is performed, generate phased images for the screen change using the captured images and control the phased images to be displayed on the screen, wherein, when the screen change corresponds to screen change according to channel change, the platform captures a first image with respect to a still image of broadcast images of a current channel and captures a second image with respect to a black mute screen when the receiving unit receives the first signal, the platform sequentially displays the first image, a third image obtained by blending the first and second images and the second image when the receiving unit receives the second signal, and the platform displays the first image or the second image when the receiving unit receives the third signal, and wherein the platform controls areas of the first image and the second image included in the blended third image on the basis of a degree by which the remote controller is dragged according to the second signal, and the processor controls the digital broadcast receiver to tune to the current channel when the area of the first image included in the third image is larger than the area of the second image at a time when the third signal is received and controls the digital broadcast receiver to tune to the neighboring channel when the area of the second image included in the third image is larger than the area of the first image.

7. The apparatus according to claim 6, wherein the platform receives the IR code through the Internet when the IR code corresponding to the external device is not present.

8. The apparatus according to claim 6, wherein the processor controls information on a neighboring channel to be displayed as an OSD when the pointer is located in an upper or lower area of the screen.

9. The apparatus according to claim 7, wherein, when the screen change corresponds to screen change according to a trick mode, the processor toggles playback or pause state when the button of the remote controller is double clicked, controls current images displayed on the screen to be played fast when the receiving unit receives the second signal and controls a playback mode to be converted to a normal playback mode when the receiving unit receives the first signal during fast playback.

10. The apparatus according to claim 7, wherein, when the screen change corresponds to screen change according to the trick mode, the processor toggles playback or pause state when the button of the remote controller is double clicked and controls content of a neighboring chapter to be displayed when the receiving unit receives the second signal, wherein, when the receiving unit continuously receives a plurality of second signals respectively corresponding to different directions in which the remote controller is moved, the processor controls content of a neighboring chapter according to the finally received second signal to be displayed.

11. A method for controlling a digital broadcast receiver for a remote controller, the method comprising:

transmitting a control signal from the remote controller to the digital broadcast receiver, wherein the control signal includes a first signal representing a state in which a button of the remote controller is pressed, a second signal representing a drag state of the remote controller with the button of the remote controller pressed, and a third signal representing a state in which the button of the remote controller is released;

calculating a position of the remote controller so as to sense the control signal;

indicating the position and motion of the remote controller as a pointer on a screen and displaying the pointer while moving the pointer in a direction in which the remote controller is moved when the second signal is received;

determining whether screen change is performed according to the control signal;

capturing broadcast images when the screen change is performed;

generating phased images for the screen change using the captured images;

controlling the phased images to be displayed on the screen, wherein, when the screen change corresponds to screen change according to channel change, the capturing the broadcast images includes: capturing a first image with respect to a still image of broadcast images of a current channel and a second image with respect to a still image of broadcast images of a neighboring channel when the digital broadcast receiver receives the first signal, wherein the controlling the phased images includes:

sequentially displaying the first image, a third image obtained by blending the first and second images and the second image when the digital broadcast receiver receives the second signal, and displaying the first image or the second image when the digital broadcast receiver receives the third signal;

controlling areas of the first image and the second image included in the blended third image on the basis of a degree by which the remote controller is dragged according to the second signal; and controlling the digital broadcast receiver to tune to the current channel when the area of the first image included in the third image is larger than the area of the second image at a time when the third signal is received or controlling the digital broadcast receiver to tune to the neighboring channel when the area of the second image included in the third image is larger than the area of the first image.

12. A method for implementing a remote controller UI, the method comprising:

transmitting a control signal from the remote controller to a digital broadcast receiver, wherein the control signal includes a first signal representing a state in which a button of the remote controller is pressed, a second signal representing a drag state of the remote controller with the button of the remote controller pressed, and a third signal representing a state in which the button of the remote controller is released;

transmitting, from the digital broadcast receiver to the remote controller, an IR code corresponding to an external device connected to the digital broadcast receiver;

transmitting the IR code from the remote controller to the external device through IR output;

calculating a position of the remote controller so as to sense the control signal;

indicating the position and motion of the remote controller as a pointer on a screen and displaying display the pointer while moving the pointer in a direction in which the remote controller is moved when the second signal is received;

determining whether screen change is performed according to the control signal;

capturing broadcast images when the screen change is performed;

generating phased images for the screen change using the captured images;

controlling the phased images to be displayed on the screen, wherein, when the screen change corresponds to screen change according to channel change, the capturing the broadcast images includes: capturing a first image with respect to a still image of broadcast images of a current channel and a second image with respect to a still image of broadcast images of a neighboring channel when the digital broadcast receiver receives the first signal, wherein the controlling the phased images includes:

sequentially displaying the first image, a third image obtained by blending the first and second images and the second image when the digital broadcast receiver receives the second signal, and displaying the first image or the second image when the digital broadcast receiver receives the third signal;

controlling areas of the first image and the second image included in the blended third image on the basis of a degree by which the remote controller is dragged according to the second signal; and controlling the digital broadcast receiver to tune to the current channel when the area of the first image included in the third image is larger than the area of the second image at a time when the third signal is received or controlling the digital broadcast receiver to tune to the neighboring channel when the area of the second image included in the third image is larger than the area of the first image.

* * * * *